(12) United States Patent
Shigematsu

(10) Patent No.: US 12,413,703 B2
(45) Date of Patent: Sep. 9, 2025

(54) INFORMATION PROCESSING APPARATUS, INFORMATION PROCESSING SYSTEM, AND METHOD

(71) Applicant: SONY SEMICONDUCTOR SOLUTIONS CORPORATION, Kanagawa (JP)

(72) Inventor: Kazuma Shigematsu, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 139 days.

(21) Appl. No.: 18/259,899

(22) PCT Filed: Dec. 24, 2021

(86) PCT No.: PCT/JP2021/048181
§ 371 (c)(1),
(2) Date: Jun. 29, 2023

(87) PCT Pub. No.: WO2022/153838
PCT Pub. Date: Jul. 21, 2022

(65) Prior Publication Data
US 2024/0073405 A1    Feb. 29, 2024

(30) Foreign Application Priority Data
Jan. 12, 2021   (JP) .................. 2021-002560

(51) Int. Cl.
*H04N 23/00*      (2023.01)
*B60W 50/14*      (2020.01)
(Continued)

(52) U.S. Cl.
CPC .......... *H04N 17/002* (2013.01); *B60W 50/14* (2013.01); *B60W 60/0053* (2020.02);
(Continued)

(58) Field of Classification Search
CPC ...... H04N 17/002; H04N 23/62; H04N 23/80; B60W 50/14; B60W 60/0053;
(Continued)

(56) References Cited

U.S. PATENT DOCUMENTS

| | | | | |
|---|---|---|---|---|
| 6,198,409 B1 * | 3/2001 | Schofield | .................. | B60R 1/12 |
| | | | | 340/436 |
| 6,392,315 B1 * | 5/2002 | Jones | ..................... | F02P 17/12 |
| | | | | 307/10.6 |

(Continued)

FOREIGN PATENT DOCUMENTS

| | | |
|---|---|---|
| JP | 2012-010132 A | 1/2012 |
| JP | 2017-140981 A | 8/2017 |
| JP | 2019-028633 A | 2/2019 |

OTHER PUBLICATIONS

International Search Report and Written Opinion of PCT Application No. PCT/JP2021/048181, issued on Mar. 22, 2022, 10 pages of ISRWO.

*Primary Examiner* — Frank F Huang
(74) *Attorney, Agent, or Firm* — CHIP LAW GROUP

(57) ABSTRACT

There is provided an information processing system that includes an image analyzing section that selects, from camera-captured images and as an image for resolution analysis, an image captured at a timing of detection of a reference line. The information processing system further includes a resolution calculating section that calculates the resolution of captured images by using a chart image for resolution analysis included in the image for resolution analysis selected by the image analyzing section. The reference line is recorded on a road, where a moving apparatus that includes the information processing system is running, at positions at a constant distance from a chart for resolution analysis installed on the road.

13 Claims, 19 Drawing Sheets

(51) Int. Cl.
*B60W 60/00* (2020.01)
*H04N 17/00* (2006.01)
*H04N 23/62* (2023.01)
*H04N 23/80* (2023.01)

(52) U.S. Cl.
CPC ............ *H04N 23/62* (2023.01); *H04N 23/80* (2023.01); *B60W 2420/403* (2013.01)

(58) Field of Classification Search
CPC ..... B60W 2420/403; B60W 2050/143; B60W 2556/25; G06V 20/56; G06T 7/00; G08G 1/00
See application file for complete search history.

(56) References Cited

U.S. PATENT DOCUMENTS

| | | | | |
|---|---|---|---|---|
| 6,720,920 B2* | 4/2004 | Breed | ................... | G01S 13/931 |
| | | | | 342/357.31 |
| 7,079,017 B2* | 7/2006 | Lang | ................... | G01S 15/931 |
| | | | | 340/436 |
| 7,579,940 B2* | 8/2009 | Schofield | ........... | G02B 27/0101 |
| | | | | 701/487 |
| 8,682,035 B2* | 3/2014 | Stiegler | ................. | G06T 7/20 |
| | | | | 701/1 |
| 11,475,576 B2* | 10/2022 | Kim | ...................... | G06V 20/58 |
| 2002/0167589 A1* | 11/2002 | Schofield | ................. | B60R 1/26 |
| | | | | 348/E7.086 |
| 2005/0134983 A1* | 6/2005 | Lynam | ...................... | B60R 1/12 |
| | | | | 359/872 |
| 2007/0073473 A1* | 3/2007 | Altan | .................... | G01S 13/862 |
| | | | | 701/518 |
| 2007/0181810 A1* | 8/2007 | Tan | ...................... | G01S 7/4811 |
| | | | | 250/341.1 |
| 2010/0139995 A1* | 6/2010 | Rudakevych | .......... | B62D 55/06 |
| | | | | 180/9.32 |
| 2010/0164731 A1* | 7/2010 | Xie | ...................... | G06V 20/52 |
| | | | | 382/128 |
| 2011/0063445 A1* | 3/2011 | Chew | .................. | G08G 5/0026 |
| | | | | 348/E7.085 |
| 2012/0158250 A1* | 6/2012 | Stiegler | ..................... | G06T 7/20 |
| | | | | 701/45 |
| 2019/0196486 A1* | 6/2019 | Ishikawa | ............... | G06V 20/597 |
| 2020/0004242 A1 | 1/2020 | Kim | | |
| 2020/0331458 A1* | 10/2020 | Nakamura | .......... | B60W 30/182 |
| 2020/0398637 A1* | 12/2020 | Chang | ................... | G08B 21/22 |
| 2022/0036473 A1* | 2/2022 | Thompson | ............. | G06Q 50/40 |
| 2022/0068137 A1* | 3/2022 | Nagasawa | .............. | G07C 5/008 |
| 2022/0147745 A1* | 5/2022 | Ghadiok | ................ | G06V 20/58 |
| 2022/0219532 A1* | 7/2022 | Wang | ..................... | G01S 15/32 |

\* cited by examiner

FIG. 2

| LEVELS | STATES OF DRIVING |
|---|---|
| LEVEL 0 | DRIVER EXECUTES ENTIRE DRIVING MANIPULATION (= MANUAL DRIVING). |
| LEVEL 1 | AUTOMATED DRIVING SYSTEM EXECUTES EITHER ACCELERATOR AND BRAKE MANIPULATION OR STEERING MANIPULATION. |
| LEVEL 2 | AUTOMATED DRIVING SYSTEM EXECUTES ACCELERATOR AND BRAKE MANIPULATION AND STEERING MANIPULATION. |
| LEVEL 3 | AUTOMATED DRIVING SYSTEM EXECUTES ENTIRE AUTOMATED DRIVING UNDER SPECIFIED CONDITIONS (E.G., PREDETERMINED FREEWAY DOMAINS, ETC.). IT SHOULD BE NOTED THAT DRIVER NEEDS TO CONSTANTLY MONITOR, AND RETURN TO MANUAL DRIVING IN EMERGENCY. |
| LEVEL 4 | AUTOMATED DRIVING SYSTEM EXECUTES ENTIRE AUTOMATED DRIVING UNDER SPECIFIED CONDITIONS. |
| LEVEL 5 | AUTOMATED DRIVING SYSTEM EXECUTES ENTIRE AUTOMATED DRIVING UNCONDITIONALLY. |

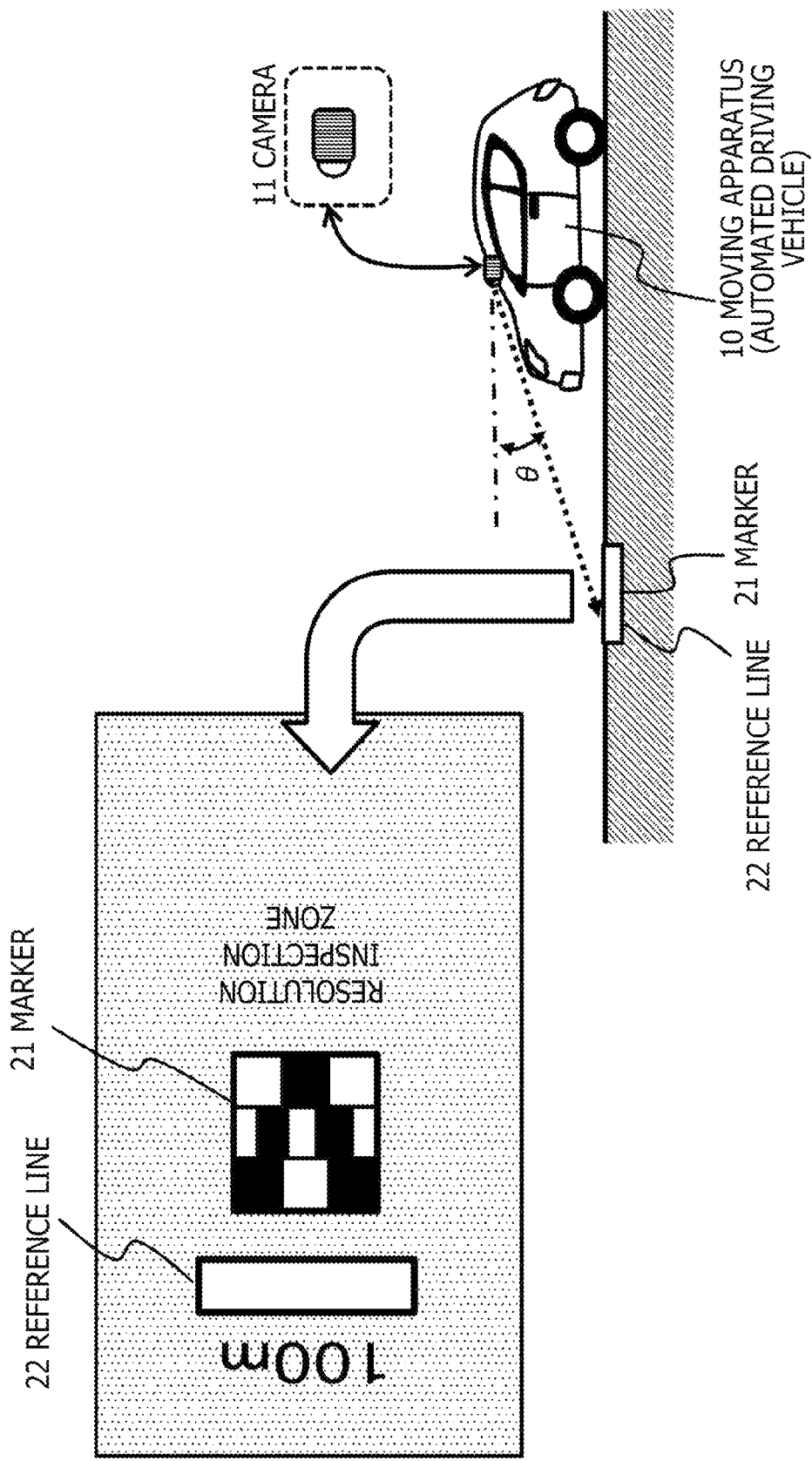

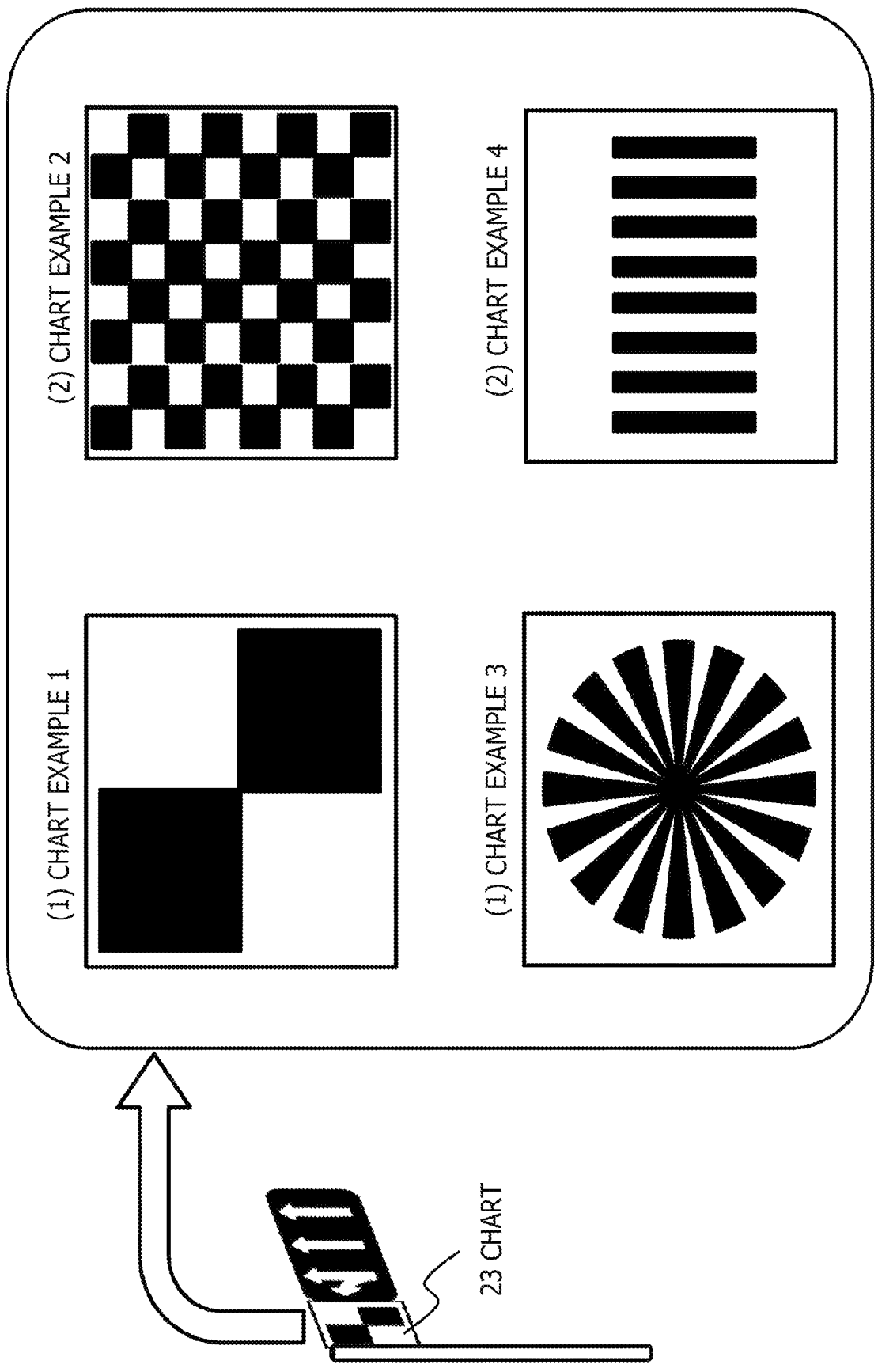

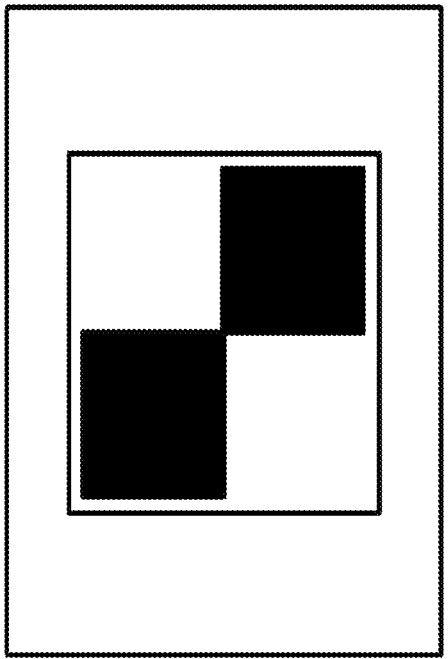
FIG. 7B IMAGE CAPTURED WITH HIGH-RESOLUTION CAMERA
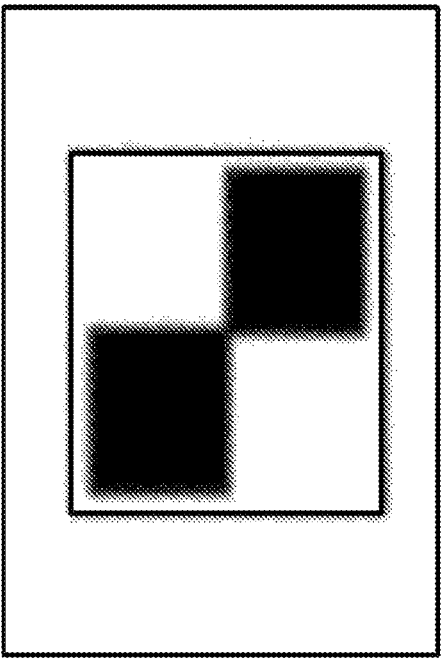
FIG. 7C IMAGE CAPTURED WITH CAMERA WITH LOWERED RESOLUTION
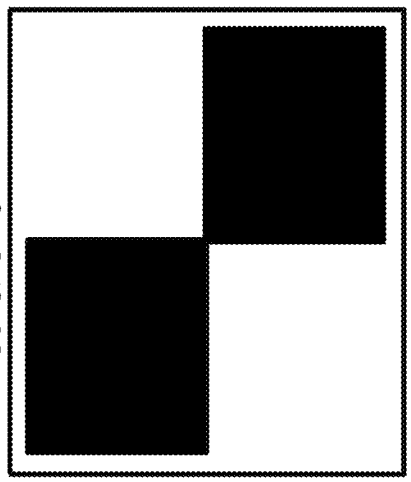
FIG. 7A IMAGE-CAPTURING-SUBJECT CHART

INFORMATION PROCESSING APPARATUS, INFORMATION PROCESSING SYSTEM, AND METHOD

CROSS REFERENCE TO RELATED APPLICATIONS

This application is a U.S. National Phase of International Patent Application No. PCT/JP2021/048181 filed on Dec. 24, 2021, which claims priority benefit of Japanese Patent Application No. JP 2021-002560 filed in the Japan Patent Office on Jan. 12, 2021. Each of the above-referenced applications is hereby incorporated herein by reference in its entirety.

TECHNICAL FIELD

The present disclosure relates to an information processing apparatus, an information processing system, a method, and a program. More specifically, the present invention relates to an information processing apparatus, an information processing system, a method, and a program that make it possible to perform safer automated driving and driving support.

BACKGROUND ART

Active technological development related to automated driving and driving support is underway in recent days.

Automated driving technology is a technology to enable automated running on roads by using various sensors such as position detection means provided on a vehicle (automobile), and its use is predicted to come into widespread use at a rapid speed in the coming future.

Detected information from various sensors such as cameras or radars is used for automated driving and driving support.

However, for example, depending on the influence of vibrations, temperature changes, and the like that occur in the running process of a vehicle, cameras mounted on the vehicle sometimes experience lowering of the image analysis performance such as deterioration of the resolutions, for example.

Assessment of such camera performance, for example, inspection as to whether or not the resolution of images captured with the cameras is maintained at initial resolutions, is typically performed with use of a dedicated tester at a dealer or the like at times of regular car inspections or the like.

However, it is predicted that, in the coming future cameras mounted on vehicles would have increasingly larger numbers of pixels and provide increasingly higher resolutions and the vehicles support automated driving with increasingly higher functionalities, leading to further prediction that deterioration of the resolutions of images captured with the cameras would cause a problem that directly leads to serious accidents.

Accordingly, it is necessary to check more highly precisely and highly frequently whether or not the resolutions of images captured with cameras are maintained at certain levels.

Note that, as a conventional technology disclosing a technology to check errors of cameras, there is PTL 1 (Japanese Patent Laid-open No. 2019-028633) or the like, for example.

However, obligating a user of a vehicle to have her/his car inspected every month or every several months, for example, places a significant burden on the user, and is actually difficult.

CITATION LIST

Patent Literature

[PTL 1]
Japanese Patent Laid-open No. 2019-028633

SUMMARY

Technical Problem

The present disclosure has been made in view of the problem mentioned above, for example, and an object thereof is to provide an information processing apparatus, an information processing system, a method, and a program that make it possible to surely execute inspections of the resolution of images captured with a camera attached to a vehicle, without placing a burden on a user.

Solution to Problem

A first aspect of the present disclosure resides in an information processing apparatus including an image analyzing section that receives input of an image captured with a camera and performs analysis of the input image, and a resolution calculating section that calculates a resolution of the captured image, in which the image analyzing section selects, from images captured with the camera and as an image for resolution analysis, an image captured at a timing of detection of a reference line at a predetermined position, and the resolution calculating section uses a chart image for resolution analysis included in the image for resolution analysis selected by the image analyzing section, to calculate the resolution of the captured image.

Moreover, a second aspect of the present disclosure resides in an information processing system including a moving apparatus and a management server, in which the moving apparatus has an image analyzing section that receives input of an image captured with a camera attached to the moving apparatus and performs analysis of the input image, a resolution calculating section that calculates a resolution of the camera, and a communication section, the image analyzing section selects, from images captured with the camera and as an image for resolution analysis, an image captured at a timing of detection of a reference line, the resolution calculating section uses a chart image for resolution analysis included in the image for resolution analysis selected by the image analyzing section, to calculate a resolution of the captured image, and transmits the calculated resolution to the management server via the communication section, and the management server executes analysis of multiple pieces of resolution data received from multiple moving apparatuses.

Further, a third aspect of the present disclosure resides in an information processing method executed in an information processing apparatus mounted on a moving apparatus, the information processing method including an image analysis step, executed by an image analyzing section, of selecting, from images captured with a camera attached to the moving apparatus and as an image for resolution analysis, an image captured at a timing of detection of a reference line, and a captured-image resolution calculation step, executed by a resolution calculating section, of using a chart image for resolution analysis included in the image for resolution analysis selected in the image analysis step, to calculate a resolution of the captured image.

Further, a fourth aspect of the present disclosure resides in an information processing method executed in an information processing system having a moving apparatus and a management server, the information processing method including an image analysis step, executed by an image analyzing section of the moving apparatus, of selecting, from images captured with a camera attached to the moving apparatus and as an image for resolution analysis, an image captured at a timing of detection of a reference line, and a resolution calculation/transmission step, executed by a resolution calculating section of the moving apparatus, of using a chart image for resolution analysis included in the image for resolution analysis selected in the image analysis step, to calculate a resolution of the captured image, and transmitting the calculated resolution to the management server, in which the management server executes analysis of multiple pieces of resolution data received from multiple moving apparatuses.

Still further, a fifth aspect of the present disclosure resides in a program that causes an information processing apparatus mounted on a moving apparatus to execute information processing, the program causing an image analyzing section to execute an image analysis step of selecting, from images captured with a camera attached to the moving apparatus and as an image for resolution analysis, an image captured at a timing of detection of a reference line, and a resolution calculating section to execute a captured-image resolution calculation step of using a chart image for resolution analysis included in the image for resolution analysis selected in the image analysis step, to calculate a resolution of the captured image.

Note that the program according to the present disclosure is a program that can be provided by a storage medium or a communication medium that provides various program codes in a computer-readable format to an information processing apparatus or a computer system that can execute the various program codes, for example. By providing such a program in the computer-readable format, processes according to the program are realized on the information processing apparatus or the computer system.

Still other objects, features, and advantages of the present disclosure will become apparent from more detailed explanations based on embodiments and attached figures of the present disclosure mentioned below. Note that a system in the present specification means logical collective configuration of multiple apparatuses, and is not limited to one that includes apparatuses of respective types of configurations that are housed within a single housing.

According to the configuration of an embodiment of the present disclosure, it is possible to realize a configuration in which images of a chart installed on a road are captured from positions at a constant distance, the captured images are analyzed to calculate a camera resolution, and a warning output/automated-driving-level lowering process is executed depending on a result of the calculation.

Specifically, for example, an image analyzing section selects, from camera-captured images and as an image for resolution analysis, an image captured at a timing of detection of a reference line. A resolution calculating section calculates the resolution of a camera by using a chart image for resolution analysis included in the image for resolution analysis selected by the image analyzing section. The reference line is recorded on a road where a moving apparatus is running, at positions at a constant distance from a chart for resolution analysis installed on the road, and a highly precise resolution of a camera based on images of the chart captured from the positions at the constant distance can be calculated.

Owing to this configuration, it is possible to realize a configuration in which images of a chart installed on a road are captured from positions at a constant distance, the captured images are analyzed to calculate a camera resolution, and a warning output/automated-driving-level lowering process is executed depending on a result of the calculation.

Note that advantages described in the present specification are presented merely for illustrative purposes, and not for limiting the advantages. There may be additional advantages.

BRIEF DESCRIPTION OF DRAWINGS

FIG. 2 is a figure for explaining automated driving levels.

FIG. 5 is a figure for explaining a configuration example of a marker on a road.

FIG. 6 is a figure for explaining specific examples of a chart for resolution analysis.

FIGS. 7A, 7B, and 7C are figures for explaining examples of captured images of the chart for resolution analysis.

DESCRIPTION OF EMBODIMENTS

Hereinbelow, details of an information processing apparatus, an information processing system, a method, and a program according to the present disclosure are explained with reference to the figures. Note that the explanation is given under the following items.

1. Overview of Configuration of and Processes Executed by Moving Apparatus (Example: Vehicle) According to Present Disclosure
2. Details of Configuration of and Processes Executed by Moving Apparatus (Example: Vehicle) According to Present Disclosure
3. Sequence of Processes Executed by Moving Apparatus and Information Processing Apparatus According to Present Disclosure
4. Configuration Examples of Moving Apparatus and Information Processing Apparatus According to Present Disclosure
5. Information Processing System Configuration Example Having Server That Collects and Analyzes Resolution Analysis Results from Each Moving Apparatus
6. Hardware Configuration Example of Information Processing Apparatus According to Present Disclosure
7. Summary of Configuration According to Present Disclosure <1. Overview of Configuration of and Processes Executed by Moving Apparatus (Example: Vehicle) According to Present Disclosure>

Figure 1:
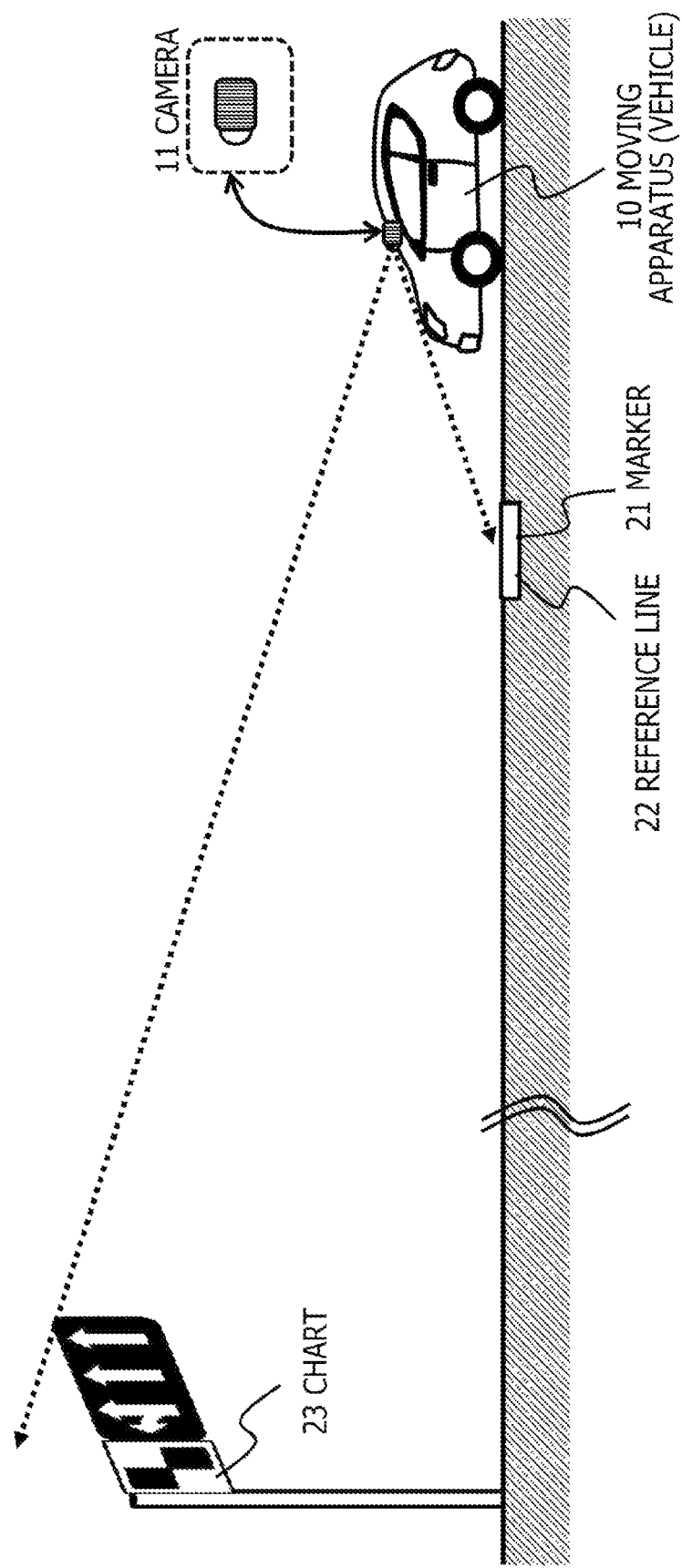
FIG. 1 is a figure for explaining an overview of the configuration of and processes executed by a moving apparatus (example: vehicle) according to the present disclosure.

With reference to FIG. 1, an overview of the configuration of and processes executed by a moving apparatus (example: vehicle) according to the present disclosure is explained.

For example, a moving apparatus (example: vehicle) 10 depicted in FIG. 1 is an automated driving vehicle or is a vehicle having a driving support functionality that enables partially automated driving. Note that the driving support functionality includes various functionalities such as automatic braking or cruise running functionalities, for example.

The vehicle 10 that is an automated driving vehicle or has a driving support functionality has various sensors provided on the vehicle 10 such as cameras, radars or position detection means, allowing the vehicle 10 to run safely on roads with use of detected information from the sensors.

The vehicle 10 depicted in FIG. 1 has a camera 11 which is one of the sensors.

However, the camera 11 mounted on the vehicle 10 sometimes experiences displacement of the attachment positions of the image sensor section and the lens section or the like due to the influence of vibrations, temperature changes, or the like that occur during the running process of the vehicle 10; as a result, for example, lowering of the quality of important functionalities as a sensor such as lowering of the resolution undesirably occurs in some cases.

For example, if the resolution of the camera 11 that captures images of the space in front of the vehicle 10 depicted in FIG. 1 lowers undesirably, the level of recognition of obstacles, traffic signs, and the like in front of the vehicle 10 lowers undesirably, making it difficult to perform safe automated driving or driving support.

Cameras mounted on vehicles have come to have increasingly larger numbers of pixels and provide increasingly higher resolutions, and also automated driving functionalities of the vehicles have been becoming higher at a rapid speed. It is required in such a situation that the resolution of images captured with a camera be always maintained at a certain level or higher. In order to maintain the resolution at the level or higher, it is necessary to perform a process of checking the resolution of images captured with a camera highly precisely and highly frequently.

The resolution of images captured with a camera depends on the lens performance of the camera, a positional misalignment between the image sensor and lens of the camera, and the image sensor pixel count of the camera. That is, the resolution of images captured with a camera is restricted by at least one of the lens performance of the camera, a positional misalignment between the image sensor and lens of the camera, and the image sensor pixel count of the camera. Note that the positional misalignment is a mechanical misalignment caused by the influence of expansion of an adhesive or the like.

The present disclosure has been made to meet this request, and makes it possible to perform inspections of the resolution of the camera 11 during running of the vehicle 10.

Note that running using automated driving or driving support using sensors such as cameras is currently allowed only in specific road domains, for example, partial domains of freeways or arterial roads, and the like. For example, these are domains specified by such a condition that infrastructure facilities that enable safe automated driving or the like are in place, and the like, and are called operational design domains (ODD).

The moving apparatus (example: vehicle) 10 performs automated driving in such operational design domains (ODD). However, in a case where the resolution of the camera 11 has lowered in such a domain, there is a possibility that it becomes difficult to perform safe automated-driving running.

According to the configuration of the present disclosure, for example, charts for camera resolution inspection are installed at the entrance of a freeway or at constant intervals on the main tracks of the freeway or are installed at positions on an arterial road where the camera 11 of the moving apparatus (example: vehicle) 10 can capture images thereof.

For example, a chart 23 for camera resolution inspection is installed on a side of a traffic sign as depicted in FIG. 1.

An image of the chart 23 is captured with the camera 11 of the moving apparatus (example: vehicle) 10. It should be noted that, in order to perform resolution analysis of the camera 11, image-capturing distances to the chart 23 need to be constant.

A marker 21 and a reference line 22 that are used to determine a position for the camera 11 to capture an image of the chart 23 are recorded on a road.

When the marker 21 on the road comes into the angle of view of the camera 11 of the moving apparatus (example: vehicle) 10, an image analyzing section that performs analysis of images captured with the camera 11 detects the marker 21, takes out an image frame including an image of the chart 23 captured at a timing of detection of the reference line 22 in front of the marker 21, and performs a resolution analysis process by treating the image frame taken out, as an image frame for resolution analysis.

By performing such a process, it becomes possible to perform resolution analysis of the camera 11 that uses captured images of the chart 23 captured from positions at a constant distance.

Note that the chart 23 is installed for each predetermined domain on the road, for example. In addition, the marker 21 and the reference line 22 are recorded at a position before each chart position installed on the road, the position being at a constant distance from the chart position.

By adopting such a configuration, the moving apparatus (example: vehicle) 10 can perform the resolution inspection repeatedly at the respective chart positions.

In such a manner, according to the configuration of the present disclosure, the camera 11 of the moving apparatus (example: vehicle) 10 captures images of the chart 23 for the resolution analysis from positions specified by the marker 21 and the reference line 22, that is, from the positions at a constant distance from the chart 23.

An information processing apparatus in the moving apparatus (example: vehicle) 10 calculates the resolution of the camera 11 by using the captured images, and assesses whether or not the resolution is maintained at a prespecified reference resolution.

Moreover, the information processing apparatus in the moving apparatus (example: vehicle) 10 outputs a warning and executes control to lower the automated driving level, for example, in a case where the resolution of the camera 11 is lower than the specified reference.

Note that SAE (Society of Automotive Engineers), which is an automobile technology organization of the United States, has defined six automated driving levels as the levels of automated driving from Level 0 (manual driving) to Level 5 (fully automated driving). Many of countries all over the world including Japan have adopted those automated driving level definitions by SAE.

With reference to FIG. 2, the automated driving level definitions by SAE are explained.

SAE has defined six automated driving levels as the levels of automated driving from Level 0 (manual driving) to Level 5 (fully automated driving) depicted in FIG. 2.

The definition (state of driving) of each automated driving level is as follows.

Level 0=A driver executes the entire driving manipulation (=manual driving).
Level 1=An automated driving system executes either accelerator and brake manipulation or steering manipulation.
Level 2=An automated driving system executes accelerator and brake manipulation and steering manipulation.
Level 3=An automated driving system executes entire automated driving under specified conditions (e.g., in predetermined freeway domains, etc.). It should be noted that a driver needs to constantly monitor, and return to manual driving in an emergency.
Level 4=An automated driving system executes entire automated driving under specified conditions.
Level 5=An automated driving system executes entire automated driving unconditionally.

SAE has defined these six automated driving levels from Level 0 (manual driving) to Level 5 (fully automated driving).

Note that the specified conditions regarding Level 3 and Level 4 are conditions specified for running at specific locations, for example. Specifically, for example, they are conditions for running or the like on freeways, in such areas as depopulated areas where the volumes of traffic are relatively small and there are fewer blind spots or in areas on campus or in airport facilities and the like where running environments are relatively simple.

In a case where the moving apparatus (example: vehicle) 10 depicted in FIG. 1 is a vehicle that supports switching between at least multiple levels in the automated driving levels defined by SAE, the information processing apparatus in the moving apparatus (example: vehicle) 10 also executes control of the automated driving level.

That is, in a case where the resolution of the camera 11 is assessed to be lower than the specified reference, control to lower the automated driving level or the like is executed.

Specifically, for example, in a case where the moving apparatus (example: vehicle) 10 depicted in FIG. 1 is a vehicle that supports switching between levels from Level 0 (manual driving) to Level 2 (partially automated driving), a vehicle that supports switching between levels from Level 0 (manual driving) to Level 4 (semi-automated driving), or a vehicle that supports switching between levels from Level 0 (manual driving) to Level 5 (fully automated driving), control to lower the automated driving level is executed.

<2. Details of Configuration of and Processes Executed by Moving Apparatus (Example: Vehicle) According to Present Disclosure>

Figure 3:
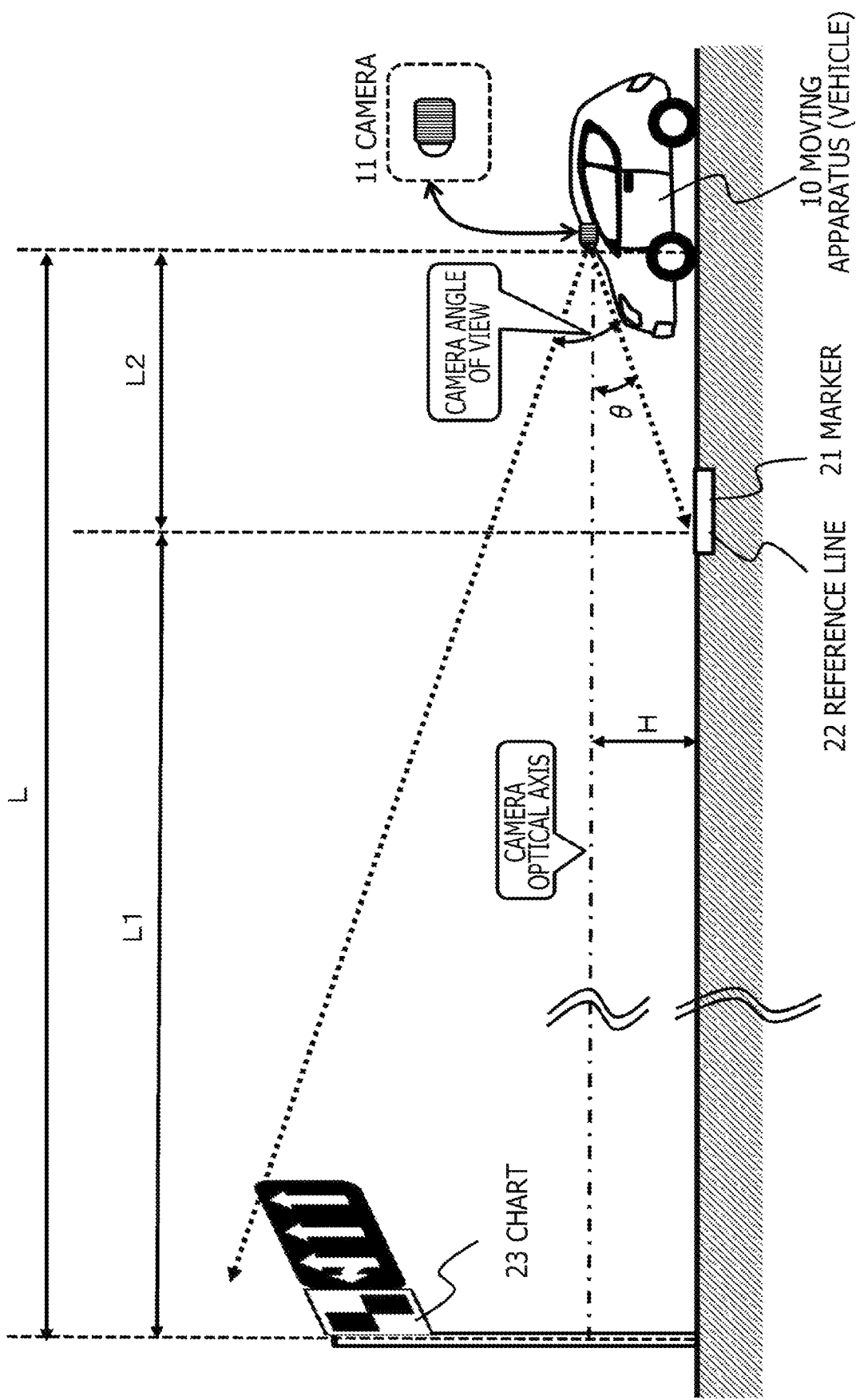
FIG. 3 is a figure for explaining the configuration of and processes executed by the moving apparatus (example: vehicle) according to the present disclosure.

Next, with reference to FIG. 3 and the subsequent figures, details of the configuration of and processes executed by the moving apparatus (example: vehicle) according to the present disclosure are explained.

FIG. 3 depicts the moving apparatus (example: vehicle) 10 similar to the one explained with reference to FIG. 1 earlier.

The camera 11 is fixed at a windshield (W/S) (=front window) section of the moving apparatus (example: vehicle) 10. It is defined that the height of the camera 11 from the road is H.

As depicted in the figure, the camera optical axis representing the camera image-capturing direction is an axis parallel to the road surface, and the camera angle of view representing the camera image-capturing range is 2θ. When the marker 21 and the reference line 22 come into the position of the lower maximum angle of view (θ) of the camera angle of view, images of the marker 21 and the reference line 22 are captured with the camera 11.

Note that the marker 21 and the reference line 22 on the road are identification marks recorded on the road for specifying a timing to capture an image for resolution analysis. Specific examples of the marker 21 and the reference line 22 are depicted in FIG. 4 and FIG. 5.

Figure 4:
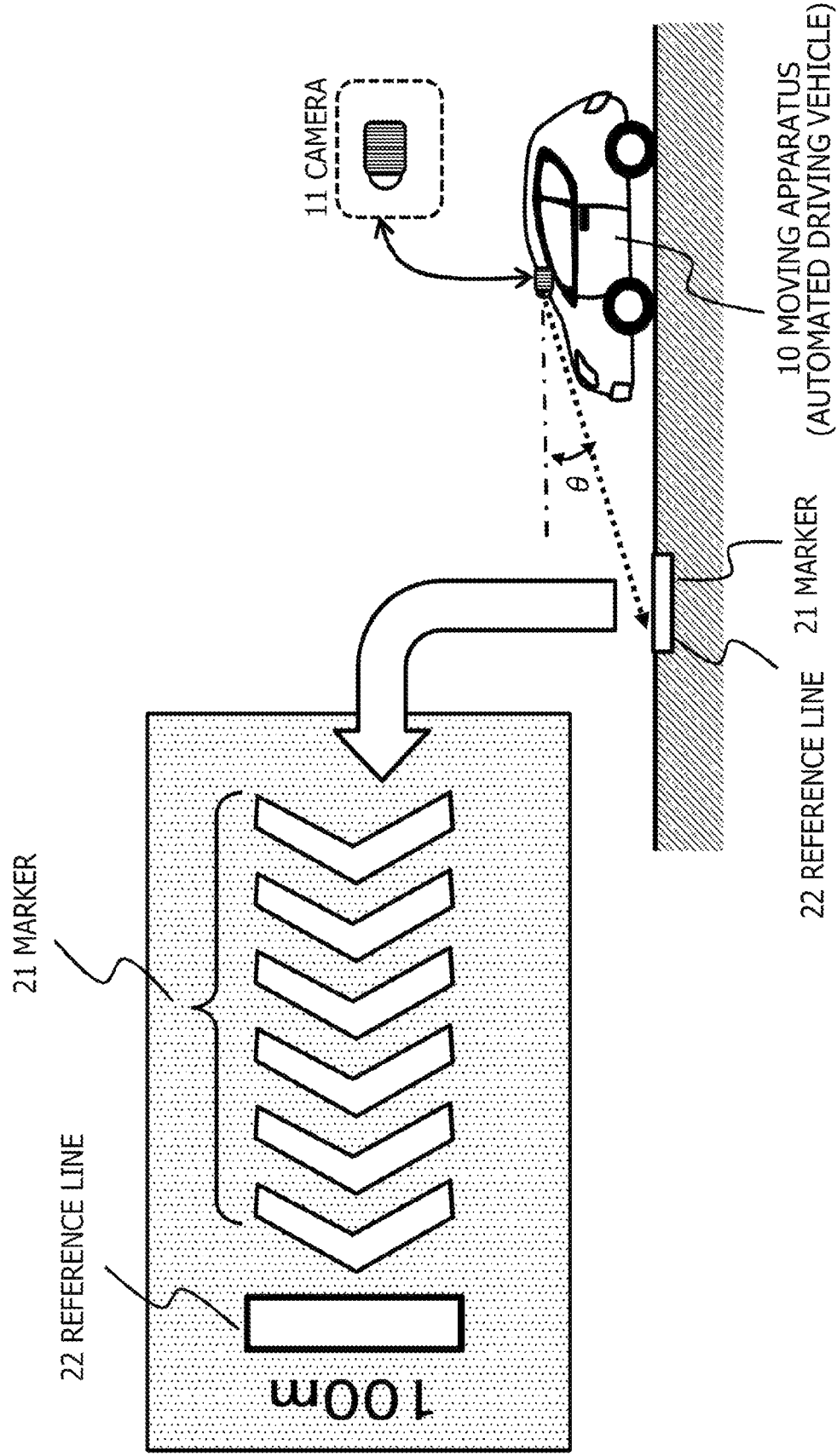
FIG. 4 is a figure for explaining a configuration example of a marker on a road.

For example, the marker 21 includes an identification mark including a graphic pattern of a specific shape (mountain-like shape) as depicted in FIG. 4 or a specific two-dimensional pattern as depicted in FIG. 5.

The marker 21 is a mark representing that the reference line 22 is recorded in front of it.

An image of the chart 23 is captured at a timing of detection of the reference line 22 in front of the marker 21, and the resolution analysis process is performed by treating this captured image frame as an image frame for resolution analysis.

Performing such a process makes it possible to perform resolution analysis of the camera 11 that uses captured images of the chart 23 captured from positions at a constant distance.

When the information processing apparatus in the moving apparatus (example: vehicle) 10 detects the marker 21 from images captured with the camera 11 and further detects the reference line 22 recorded in front of the marker 21 while the moving apparatus (example: vehicle) 10 is running on the road, the information processing apparatus selects an image frame captured at a timing of detection of the reference line 22 as an image frame for camera resolution analysis, and executes resolution analysis of the camera 11 in reference to an image of the chart 23 captured in the selected image frame.

Note that the information processing apparatus in the moving apparatus (example: vehicle) 10 selects the image frame for camera resolution analysis according to the image position of the reference line 22 detected in an image captured with the camera 11. Specifically, the image position of the reference line 22 in an image captured at a timing when the distance between the chart 23 and the camera 11 attached to the moving apparatus (example: vehicle) 10 satisfies L (=L1+L2) depicted in FIG. 3 is registered in advance in a memory, and this registration information and the image positions of the reference line 22 in captured images are compared with each other to select an image captured at a matching timing as the image frame for camera resolution analysis.

Note that the chart 23 is installed next to a traffic sign, for example. Alternatively, the chart 23 is installed on a road as a dedicated independent traffic sign.

For analysis of the camera resolution, a chart for resolution analysis having a specific image pattern is used.

Specific examples of the chart for resolution analysis are depicted in FIG. 6.

FIG. 6 depicts multiple examples of the chart (image pattern) to be used for analyzing the resolution of images captured with a camera. For example, such a chart is installed next to a traffic sign on a road or at another similar location. Note that whereas FIG. 6 depicts four types of chart for resolution analysis, there can be various charts other than this.

Analysis of the resolution of images captured with a camera is executed in reference to images capturing such charts.

FIGS. 7A, 7B, and 7C are figures depicting a chart-capturing image example in a case where a chart is captured with a camera having a high resolution and a chart-capturing image example in a case where the chart is captured with a camera having a lowered resolution.

FIG. 7A depicts an image-capturing-subject chart.

FIG. 7B depicts a chart-capturing image example in a case where the image-capturing-subject chart in FIG. 7A is captured with a camera having a high resolution.

FIG. 7C depicts a chart-capturing image example in a case where the same image-capturing-subject chart in FIG. 7A is captured with a camera having a lowered resolution.

In such a manner, even in a case where images of the same chart are captured, the image captured with the camera having the lowered resolution is an image with blurred edges.

Note that, in order to correctly analyze the resolution of images captured with a camera, it is necessary to perform the analysis by using images of the chart 23 captured from positions at a prespecified distance.

In the example depicted in FIG. 3, the distance (L) between the camera 11 and the chart 23 is the sum of two distances:

L1: the distance between the camera 11 and the reference line 22, and

L2: the distance between the reference line 22 and the chart 23, that is, L=L1+L2.

The distance L2 is the distance between the camera 11 and the reference line 22, and this distance L2 is calculated in accordance with the following formula from the lower angle of view θ (the camera optical axis and the lower field of view of the camera) and the height (H) of the camera, which are fixed values. Note that it is supposed here that the camera optical axis is parallel to a ground.

$$L2 = H \times (\cot \theta)$$

In the formula described above, since the height (H) of the camera and the lower angle of view θ are both fixed values, the distance L2 between the camera 11 and the reference line 22 also is a fixed value.

The distance L1 between the reference line 22 and the chart 23 also is set as a prespecified distance; as a result, the distance (L) between the camera 11 and the chart 23, that is, $$L = L1 + L2$$

is a fixed value.

As a result, the camera 11 of the moving apparatus (example: vehicle) 10 captures images of the chart 23 from positions at a constant distance (L=L1+L2), and performs the resolution analysis by using the images captured from the positions at the constant distance.

Performing such a process makes it possible to perform highly precise resolution analysis.

Note that, for example, the chart 23 is a chart including a pattern image for resolution analysis as explained with reference to FIG. 6 earlier.

For example, similarly to a normal traffic sign, the chart 23 installed on a road can be formed by printing the pattern image on a plate-like material.

Note that, in one possible manner of configuration, in order to maintain the visibility of the chart, a light source such as an LED light source is arranged in front of the chart 23 to illuminate the chart (pattern image).

In addition, in one possible manner of configuration, the chart 23 is made of a light-transmitting material, a light source such as an LED light source is provided behind the chart 23, and the chart (pattern image) is illuminated from behind.

Note that, in a case where illumination by a light source is performed, in order to prevent flicker, the Duty ratio of ON/OFF of the light source is preferably set to a sufficiently small value relative to the shutter speed of a camera.

In addition, since the visibility lowers undesirably due to reflected light if direct sunlight is incident on the chart 23, a "visor" may be provided as done for a traffic light, for example, in order to prevent the chart 23 from being illuminated with direct sunlight.

Note that the camera 11 of the moving apparatus (example: vehicle) 10 continuously captures images of the space in front of the moving apparatus (example: vehicle) 10. When the information processing apparatus in the moving apparatus (example: vehicle) 10 detects the reference line 22 from images captured with the camera 11 while the moving apparatus (example: vehicle) 10 is running on a road, the information processing apparatus selects, as an image frame for camera resolution analysis, an image frame captured at a timing of detection of the reference line.

Moreover, the information processing apparatus in the moving apparatus (example: vehicle) 10 executes the resolution analysis process of the camera 11 in reference to an image of the chart 23 captured in the selected image frame.

In a case where the resolution is equal to or lower than the prespecified threshold value as a result of the resolution analysis of the camera 11, the information processing apparatus in the moving apparatus (example: vehicle) 10 outputs a warning to a driver via a display section or a speaker, for example.

Figure 8:
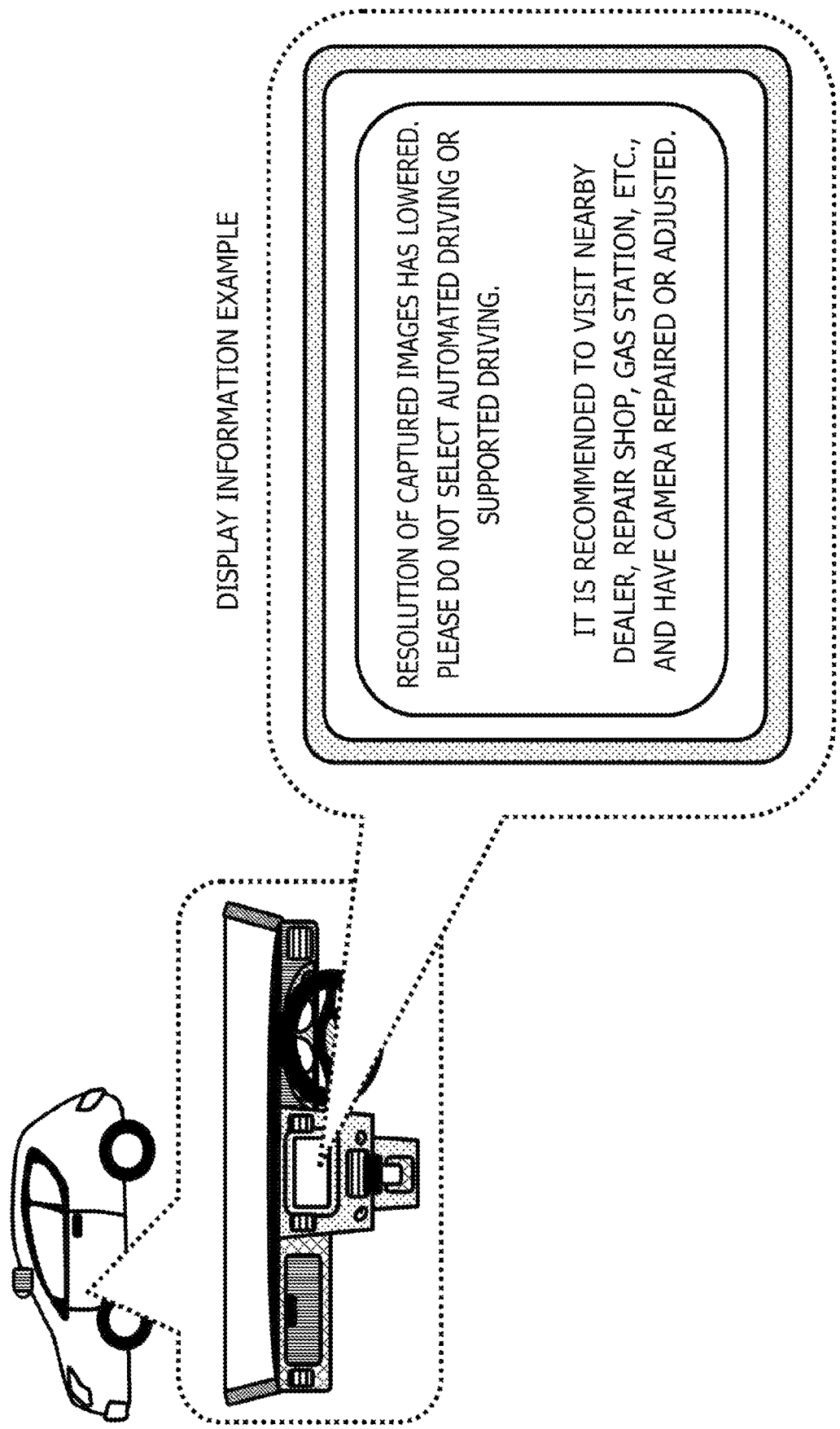
FIG. 8 is a figure for explaining an example of display data output by an information processing apparatus according to the present disclosure.

A warning message display example is depicted in FIG. 8.

FIG. 8 depicts an example in which the following warning message is displayed on the display section.

This is a display example of a message that reads "Resolution of captured images has lowered. Please do not select automated driving or supported driving. It is recommended to visit nearby dealer, repair shop, gas station, etc., and have camera repaired or adjusted."

When a user (driver) looks at this message, the user can recognize that the resolution of images captured with the camera has lowered, allowing her/him to cope with the situation by requesting a repair and the like, without delay.

Note that the warning message depicted in FIG. 8 is an example. Other than this, in one possible manner of configuration, for example, warnings to give notice that the reliability of automated driving processing functionalities such as an autonomous brake system (AEB: Autonomous Emergency Braking) or an adaptive cruise control apparatus (ACC: Adaptive Cruise Control) has lowered are output.

Figure 9:
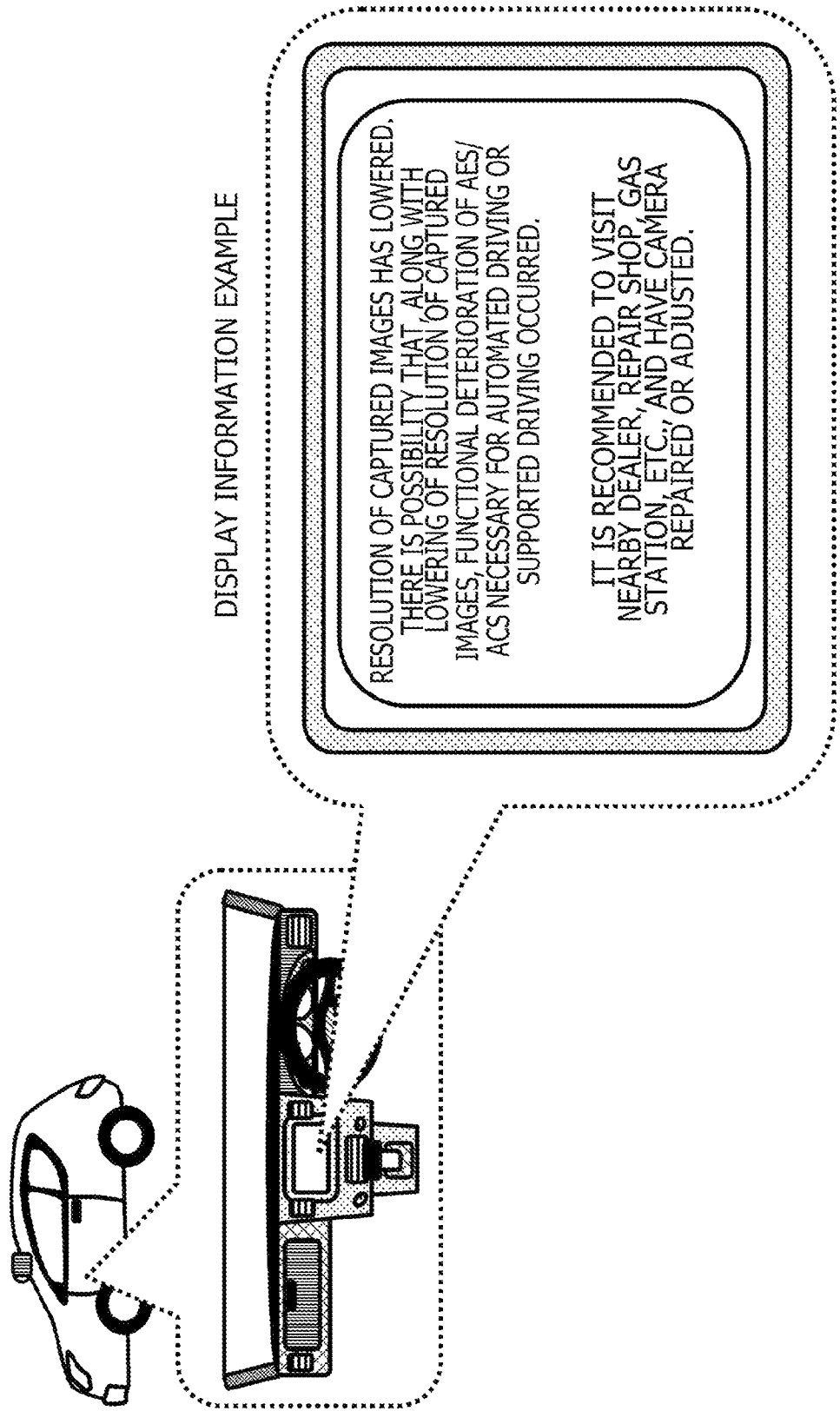
FIG. 9 is a figure for explaining an example of display data output by the information processing apparatus according to the present disclosure.

For example, examples of warning messages include a warning message as depicted in FIG. 9, that is, "Resolution of captured images has lowered. There is possibility that, along with lowering of resolution, functional deterioration of AES/ACS necessary for automated driving or supported driving occurred. It is recommended to visit nearby dealer, repair shop, gas station, etc., and have camera repaired or adjusted."

Furthermore, in a case where the moving apparatus (example: vehicle) 10 is executing automated driving, in one possible manner of configuration, a process of lowering the control level of the automated driving is performed or a warning to prompt switching to manual driving is output.

Note that, in a preferred manner of configuration, the chart 23 depicted in FIG. 3 is arranged in plural number at predetermined intervals on a road, for example, along with the markers 21 and the reference lines 22.

The information processing apparatus in the moving apparatus (example: vehicle) 10 can calculate a more precise resolution by executing a process of adding together and determining the average of multiple resolution calculation results calculated in reference to chart-capturing images obtained at multiple different geographical points as described above, for example.

For example, it becomes possible to calculate a highly precise value reflecting corrections of variations of resolution calculation values caused by the state of the atmospheric air or the like at times of image capturing.

In addition, for example, in a case where a large truck or the like is running ahead, an image of the chart cannot be captured in some cases.

Even in such a case, if many charts are arranged at predetermined intervals on a road, it becomes possible to successfully capture an image of any of the charts, and surely perform a resolution calculation.

<3. Sequence of Processes Executed by Moving Apparatus and Information Processing Apparatus According to Present Disclosure>

Next, a sequence of processes executed by the moving apparatus and the information processing apparatus according to the present disclosure is explained.

Figure 10:
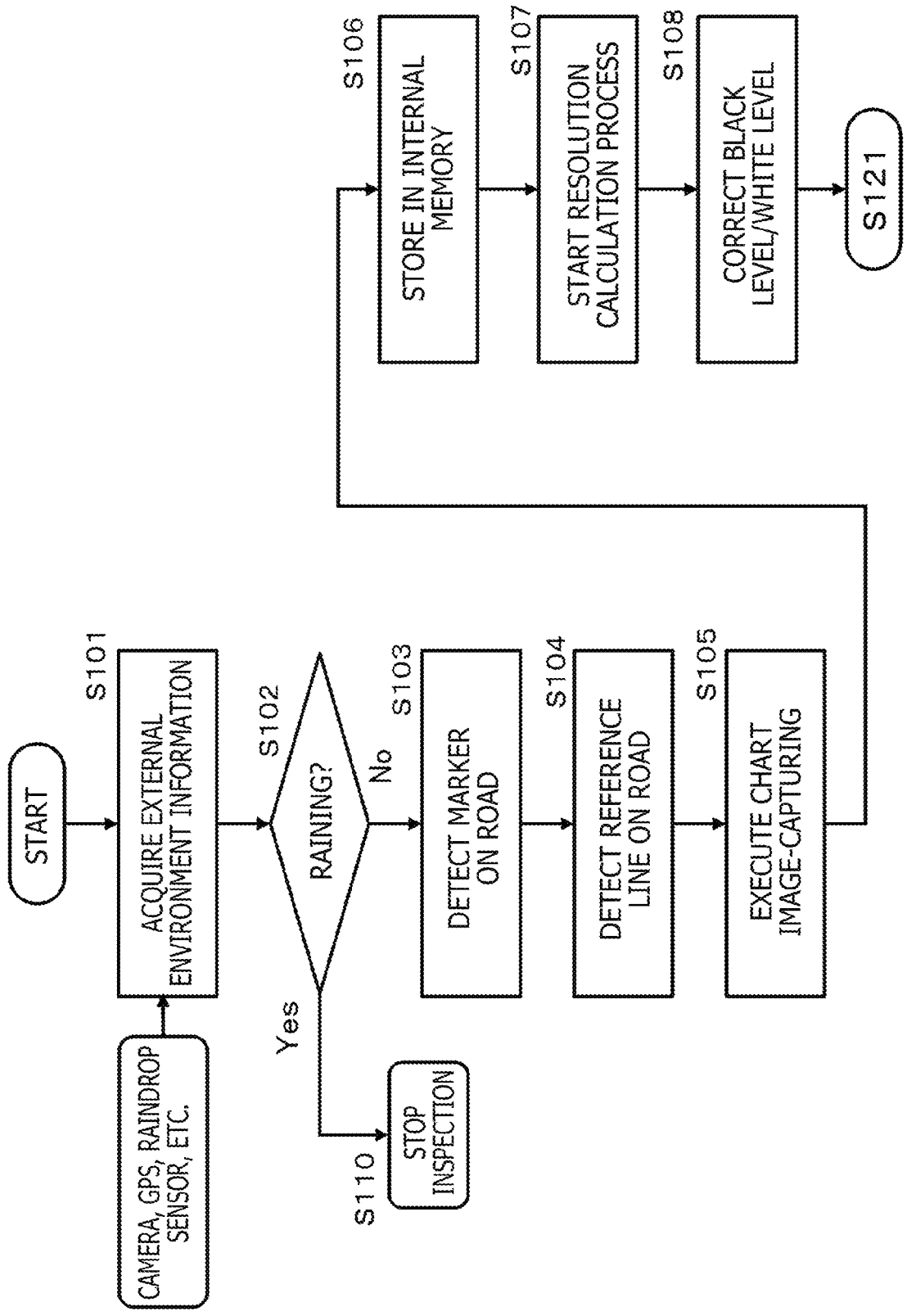
FIG. 10 is a figure depicting a flowchart for explaining a sequence of processes executed by the information processing apparatus according to the present disclosure.
Figure 11:
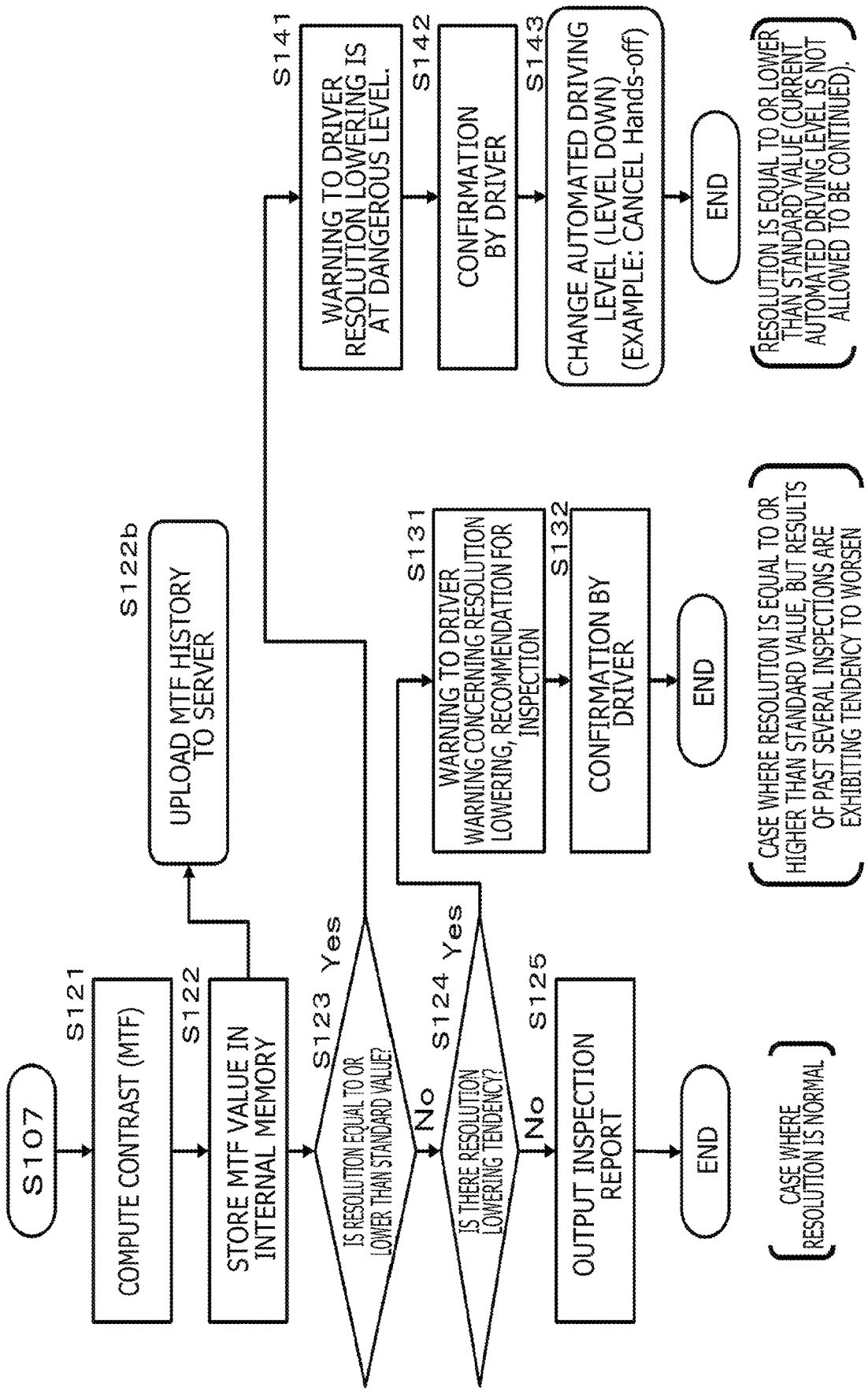
FIG. 11 is a figure depicting a flowchart for explaining the sequence of processes executed by the information processing apparatus according to the present disclosure.

With reference to flowcharts depicted in FIG. 10 and FIG. 11, a sequence of processes executed by the moving apparatus (example: vehicle) 10 and the information processing apparatus mounted in the moving apparatus (example: vehicle) 10 according to the present disclosure is explained.

Note that the processes according to the procedure explained below can be executed in accordance with programs stored in a storage section of the information processing apparatus mounted in the moving apparatus (example: vehicle) 10, for example. For example, the processes are executed under the control of a data processing section (control section) having a CPU or the like having a program execution functionality.

Hereinbelow, a process of each step in the flowcharts depicted in FIG. 10 and FIG. 11 is explained sequentially.

(Step S101)

First, the data processing section of the information processing apparatus mounted in the moving apparatus (example: vehicle) 10 executes an external environment information acquisition process using the camera 11 attached in the moving apparatus (example: vehicle) 10 and various sensors attached to the moving apparatus (example: vehicle) 10 such as a GPS or a raindrop sensor.

For example, the data processing section receives input of images captured with the camera 11, and further performs a positional information acquisition process by using the GPS, a rainfall information acquisition process by using the raindrop sensor, and the like.

(Step S102)

In Step S102, the data processing section of the information processing apparatus assesses whether or not it is raining on a road where the moving apparatus (example: vehicle) 10 is running, in reference to the external environment information acquired in Step S101. This process is performed using information detected by the raindrop sensor.

In a case where it is raining, the sight is bad, and a highly precise resolution calculation is difficult even if resolution analysis based on a chart-capturing image from the camera 11 is performed. Accordingly, resolution analysis by chart image-capturing is not performed.

This process is a process in a case where an assessment result in Step S102 in the procedure is Yes (=it is raining) and the procedure proceeds to Step S110 (stop inspection).

On the other hand, in a case where an assessment result in Step S102 is No (=it is not raining), the sight is good, it is determined that highly precise resolution analysis based on a chart-capturing image from the camera 11 is possible, and resolution analysis by chart image-capturing is executed.

In this case, an assessment result in Step S102 in the procedure is No (=it is not raining), and the procedure proceeds to processes of Step S103 and the subsequent steps.

(Step S103)

In a case where an assessment result in Step S102 is No (=it is not raining), processes of Step S103 and the subsequent steps are executed.

In Step S103, the data processing section of the information processing apparatus receives input of images captured with the camera 11 that captures images of the space in front of the moving apparatus (example: vehicle) 10, executes image analysis, and detects the marker 21 from the captured images.

For example, the marker 21 is a marker explained with reference to FIG. 3 earlier. That is, the marker 21 is a marker recorded at a position before the reference line 22 specified as a point where an image of the chart 23 to be used for the resolution analysis should be captured, and recorded at a road surface position where the camera 11 of the moving apparatus (example: vehicle) 10 can capture the image.

In a case where it is assessed in Step S103 that an image of the marker 21 is detected in an image captured with the camera 11, the procedure proceeds to Step S104.

(Step S104)

In a case where an image of the marker 21 is detected in Step S103 from an image captured with the camera 11, next in Step S104, the data processing section of the information processing apparatus detects the reference line 22 in an image captured with the camera 11.

As explained with reference to FIG. 3 and the like earlier, the reference line 22 is a reference line for setting, as an image frame for resolution analysis, an image frame of the chart 23 captured at a timing of detection of the reference line 22. That is, the reference line is a reference line recorded on a road at a position at a specified distance apart from the chart 23 for specifying a distance and a timing for capturing an image for executing the resolution analysis process.

In a case where it is assessed in Step S104 that an image of the reference line 22 is detected from an image captured with the camera 11, the procedure proceeds to Step S105.

(Step S105)

In a case where an image of the reference line 22 is detected in Step S104 from an image captured with the camera 11, next in Step S105, the data processing section of the information processing apparatus executes a chart image-capturing process.

The chart which is an image-capturing subject is the chart 23 explained with reference to FIG. 3, FIG. 6, and the like earlier. For example, the chart 23 is installed on a road next to a traffic sign or as a dedicated independent traffic sign.

For example, as explained with reference to FIG. 6 earlier, the chart is a chart (image pattern) to be used for analyzing the resolution of images captured with a camera.

In Step S105, for example, a chart image-capturing process as depicted in FIG. 6 is executed at a timing of detection of the reference line 22 in an image captured with the camera 11.

(Step S106)

Next, in Step S106, the information processing apparatus in the moving apparatus (example: vehicle) 10 stores, in an internal memory (storage section) and as an image for camera resolution analysis, an image captured with the camera at the position of the reference line 22.

Note that, as explained with reference to FIG. 3 earlier, the information processing apparatus in the moving apparatus (example: vehicle) 10 selects the image frame for camera resolution analysis in reference to the image position of the reference line 22 detected in an image captured with the camera 11. Specifically, the image position of the reference line 22 in an image captured at a timing when the distance between the chart 23 and the camera 11 attached to the moving apparatus (example: vehicle) 10 satisfies L (=L1+L2) depicted in FIG. 3 is registered in advance in the memory, this registration information and the image positions of the reference line 22 in captured images are compared with each other to select an image captured at a matching timing as the image frame for camera resolution analysis, and the selected image is stored in the internal memory (storage section).

(Step S107)

Next, in Step S107, the information processing apparatus in the moving apparatus (example: vehicle) 10 starts a camera resolution calculation process by using the image for camera resolution analysis stored in the internal memory (storage section).

The image for camera resolution analysis stored in the memory (storage section) is a captured image of the chart 23. For example, as explained with reference to FIG. 6 earlier, the chart is a chart (image pattern) to be used for analyzing the resolution of images captured with a camera.

As explained with reference to FIGS. 7A, 7B, and 7C earlier, the blurredness of edges of a white-black pattern included in the chart differs depending on differences in the resolution of images captured with a camera.

(Step S108)

In Step S108, the information processing apparatus in the moving apparatus (example: vehicle) 10 executes a black level/white level correction of the image for camera resolution analysis acquired from the memory (storage section).

This level correction is executed for the purpose of, for example, correcting errors of the black and white levels caused by an environment where image-capturing is performed.

After the black and white level correction is executed, the procedure proceeds to the next Step S121.

(Step S121)

Next, in Step S121, the information processing apparatus in the moving apparatus (example: vehicle) 10 executes a process of calculating a modulation transfer function (MTF) which is an index value of the contrast of the image for camera resolution analysis, that is, the chart image, that has been subjected to the black and white level correction.

The value of the modulation transfer function (MTF) is used as an index value of the resolution of the image captured with the camera.

(Steps S122 and S122b)

Next, in Step S122, the information processing apparatus in the moving apparatus (example: vehicle) 10 stores, in the internal memory of the information processing apparatus, the value of the modulation transfer function (MTF) calculated in Step S121 or a resolution calculated in reference to the value of the modulation transfer function (MTF).

Further, in Step S122b, the value of the modulation transfer function (MTF) or the resolution calculated in reference to the value of the modulation transfer function (MTF) is transmitted (uploaded) to an external management server.

Note that, when the value of the modulation transfer function (MTF) or the resolution calculated in reference to the value of the modulation transfer function (MTF) is transmitted (uploaded) to the external management server, an identifier (ID) of the moving apparatus (example: vehicle) 10 or the information processing apparatus, and further, the calculation timing (date/time) of the modulation transfer function (MTF) or the resolution also are transmitted along with the value of the modulation transfer function (MTF) or the resolution.

The management server receives the value of the modulation transfer function (MTF) or the resolution from each vehicle, generates MTF (or resolution) history data of each moving apparatus, and records the history data in a database in the server.

By referring to the history data, the management server analyzes a lowering tendency of the resolution of images captured with the camera attached to each moving apparatus, and, for example, in a case where the resolution has lowered to a tolerance level required for automated driving, performs a process of transmitting a warning to the moving apparatus.

(Step S123)

Next, in Step S123, the information processing apparatus in the moving apparatus (example: vehicle) 10 assesses whether or not the value of the modulation transfer function (MTF) or resolution which is a contrast index value calculated in Step S121 is equal to or lower than a prespecified standard value (threshold value), that is, a standard value necessary for safely executing automated driving.

In a case where the contrast index value is not equal to or lower than the standard value, that is, the modulation transfer function (MTF) or resolution of the camera 11 attached to the moving apparatus (example: vehicle) satisfies the standard value necessary for safely executing automated driving, the procedure proceeds to Step S124.

On the other hand, in a case where it is assessed that the contrast index value is equal to or lower than the standard value, that is, the camera 11 does not satisfy the standard value necessary for safely executing automated driving, the procedure proceeds to Step S141.

(Step S124)

In a case where it is assessed in Step S123 that the value of the modulation transfer function (MTF) or resolution which is the contrast index value is not equal to or lower than the prespecified standard value, that is, the standard value necessary for safely executing automated driving, a process of Step S124 is executed.

In Step S124, the information processing apparatus in the moving apparatus (example: vehicle) 10 assesses whether or not the resolution of the camera 11 attached to the moving apparatus (example: vehicle) is exhibiting a tendency to lower. This assessment process is executed by reference to history data of MTF values (or resolution values) stored in the internal memory of the information processing apparatus in the moving apparatus (example: vehicle) 10, for example. Alternatively, the assessment process may be executed by acquiring MTF value (or resolution value) history data of the camera of the subject vehicle from the management server.

In a case where it is assessed in Step S124 that the resolution of the camera 11 attached to the moving apparatus (example: vehicle) is not exhibiting a tendency to lower, the procedure proceeds to Step S125.

On the other hand, in a case where it is assessed that the resolution of the camera 11 attached to the moving apparatus (example: vehicle) is exhibiting a tendency to lower, the procedure proceeds to Step S131.

(Step S125)

A process of Step S125 is executed in a case where it is assessed in Step S124 that the resolution of the camera 11 attached to the moving apparatus (example: vehicle) is not exhibiting a tendency to lower.

In this case, in Step S125, the information processing apparatus in the moving apparatus (example: vehicle) 10 generates an inspection report indicating that the resolution of the camera 11 attached to the moving apparatus (example: vehicle) is not exhibiting a tendency to lower, and outputs the inspection report. For example, a display section of the moving apparatus (example: vehicle) is caused to display the inspection report indicating that the resolution of the camera 11 is not exhibiting a tendency to lower, and the process is ended.

(Step S131)

On the other hand, in a case where it is assessed in Step S124 that the resolution of the camera 11 attached to the moving apparatus (example: vehicle) is exhibiting a tendency to lower, processes of Steps S131 and S132 are executed.

In Step S131, the information processing apparatus in the moving apparatus (example: vehicle) 10 outputs a warning to a user (driver).

Figure 12:
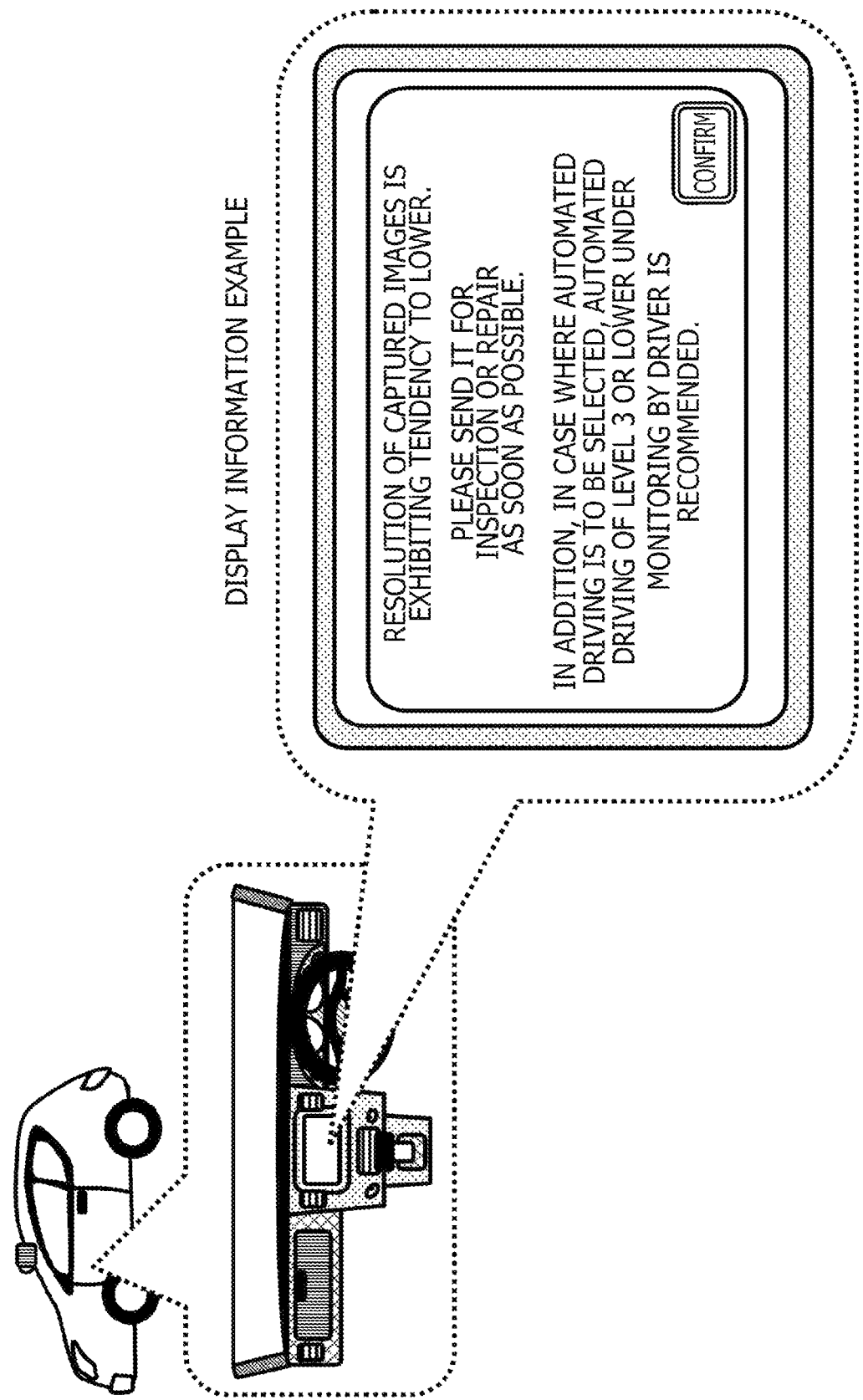
FIG. 12 is a figure for explaining an example of display data output by the information processing apparatus according to the present disclosure.

For example, a warning message as depicted in FIG. 12 is output.

That is, the warning message is output as follows.

"Resolution of captured images is exhibiting tendency to lower. Please send it for inspection or repair as soon as possible. In addition, in case where automated driving is selected, automated driving of Level 3 or lower under monitoring by driver is recommended."

When the user (driver) looks at this message, the user can recognize that the resolution of images captured with the camera has lowered, allowing her/him to cope with the situation by requesting a repair and the like, without delay.

(Step S132)

In a case where the user (driver) looks at and confirms the warning displayed on the display section in Step S131, she/he touches a confirmation icon displayed on the display section (touch panel).

Upon detecting the confirmation icon touch process by the user (driver), the information processing apparatus in the moving apparatus (example: vehicle) 10 assesses that the confirmation by the user has been completed, and ends the process.

(Step S141)

Processes of Steps S141 to S143 are processes to be executed in a case where it is assessed in Step S123 that the value of the modulation transfer function (MTF), which is the contrast index value calculated in Step S121, is equal to or lower than the prespecified standard value, that is, the standard value necessary for safely executing automated driving.

In this case, in Step S141, the information processing apparatus in the moving apparatus (example: vehicle) 10 outputs a warning to the user (driver).

For example, the display section of the moving apparatus (example: vehicle) 10 is caused to display warning information.

Figure 13:
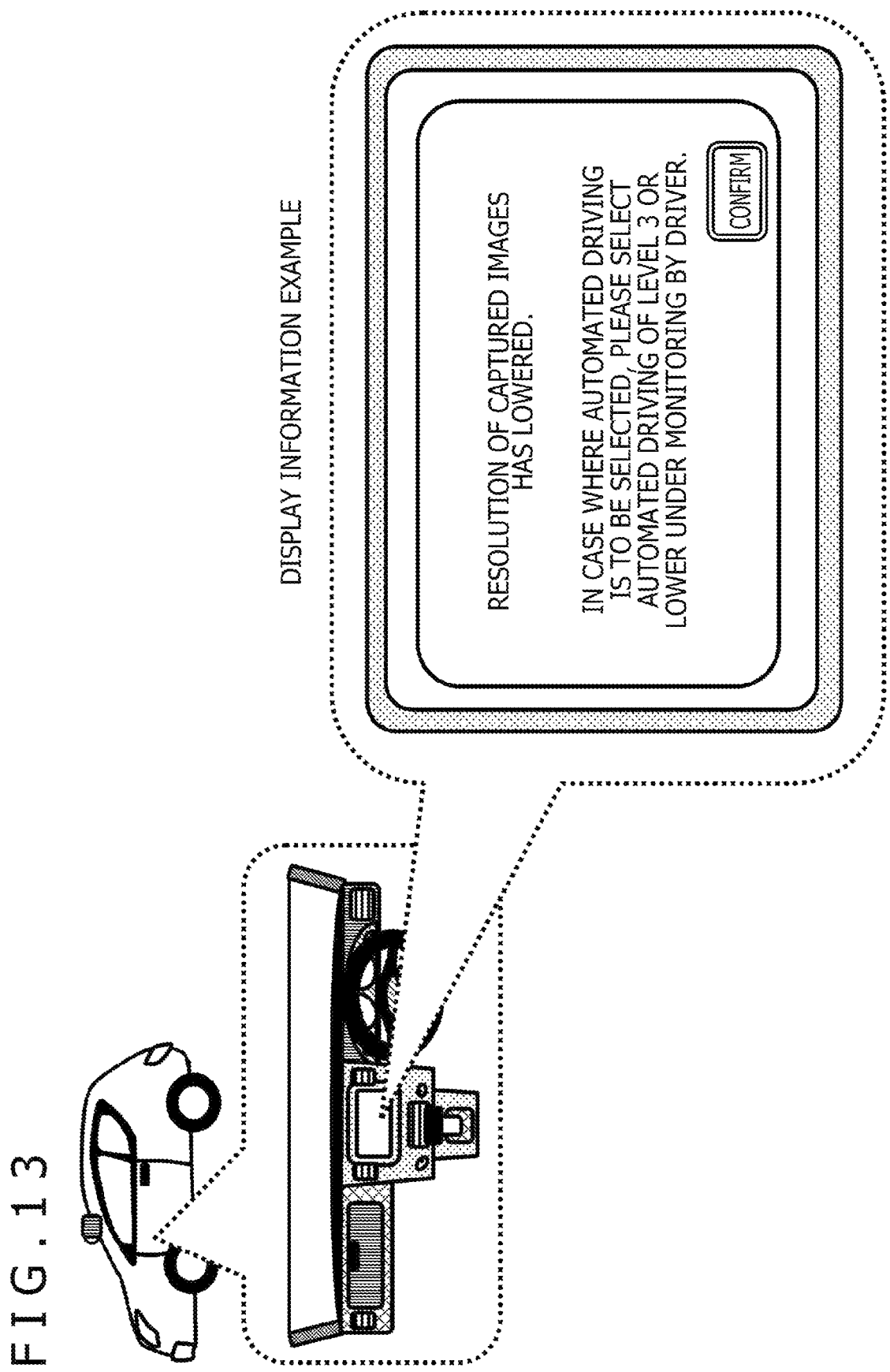
FIG. 13 is a figure for explaining an example of display data output by the information processing apparatus according to the present disclosure.

FIG. 13 depicts a specific example of display data.

As depicted in FIG. 13, the warning information is displayed on the display section which the driver (driver) of the moving apparatus (example: vehicle) 10 can observe.

The display information example depicted in FIG. 13 is an example in which the following message is displayed.

"Resolution of captured images has lowered. In case where automated driving is to be selected, please select automated driving of Level 3 or lower under monitoring by driver."

By looking at the message displayed on the display section, it becomes possible for the driver, who is a user, to recognize that there is a possibility that the resolution of images captured with the camera has lowered, and to stop transition to automated driving or to select automated driving at a low level and cope with the situation by paying close attention during the automated driving, for example.

(Step S142)

In a case where the user (driver) looks at and confirms the warning displayed on the display section in Step S141, she/he touches a confirmation icon displayed on the display section (touch panel) depicted in FIG. 13, for example.

Upon detecting the confirmation icon touch process by the user (driver), the information processing apparatus in the moving apparatus (example: vehicle) 10 assesses that the confirmation by the user has been completed, and the procedure proceeds to Step S143.

(Step S143)

In Step S143, the information processing apparatus in the moving apparatus (example: vehicle) 10 executes a process of lowering the level of automated driving currently being executed.

For example, in a case where the level of automated driving currently being executed is Level 5, a process of switching to automated driving of Level 4 or the like is executed.

Note that, in one possible manner of setting, to which lowered level the level of automated driving is switched is changed depending on the degree of lowering of the analyzed camera resolution, for example.

For example, in one possible manner of configuration, a process of lowering the automated driving level by one level is performed in a case where the degree of lowering of the camera resolution is small, a process of lowering the automated driving level by two or three levels is performed in a case where the degree of lowering of the camera resolution is significant, for example.

When the automated driving level lowering process is completed in Step S143, the series of processing ends.

Note that whereas an example of the warning information presented to the driver of the moving apparatus (example: vehicle) 10 in Step S141 has been explained with reference to FIG. 13, the example depicted in FIG. 13 is an example, and the warning information presented to the driver can be any of various types of information.

Figure 14:
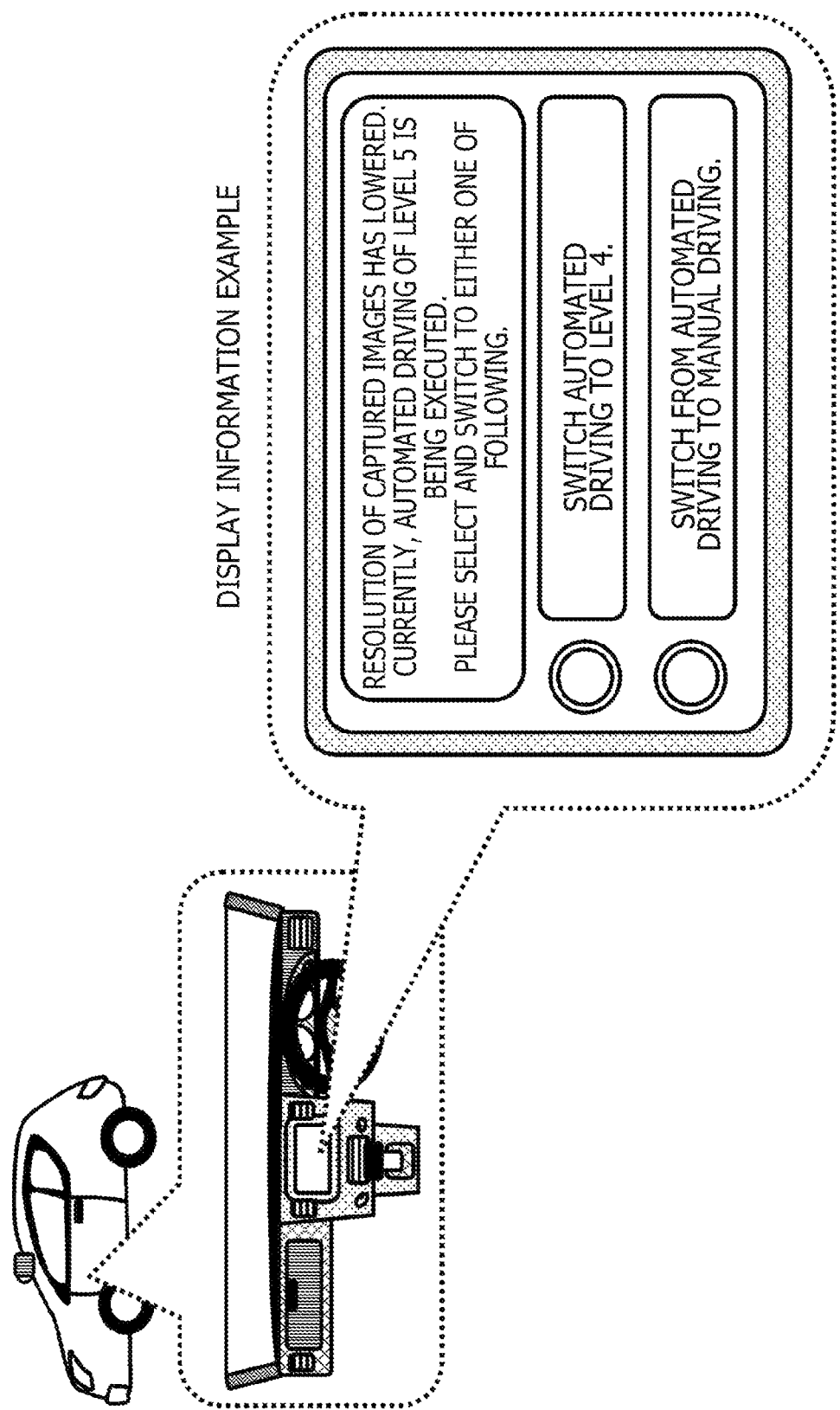
FIG. 14 is a figure for explaining an example of display data output by the information processing apparatus according to the present disclosure.

FIG. 14 depicts a specific example of the different types of display data.

The display information example depicted in FIG. 14 is an example in which the following message is displayed.

"Resolution of captured images has lowered. Currently, automated driving of Level 5 is being executed. Please select and switch to either one of following." Further, the following choices are displayed.

Switch automated driving to Level 4.

Switch from automated driving to manual driving.

The driver, who is a user, looks at the message displayed on the display section, and selects either choice.

Figure 15:
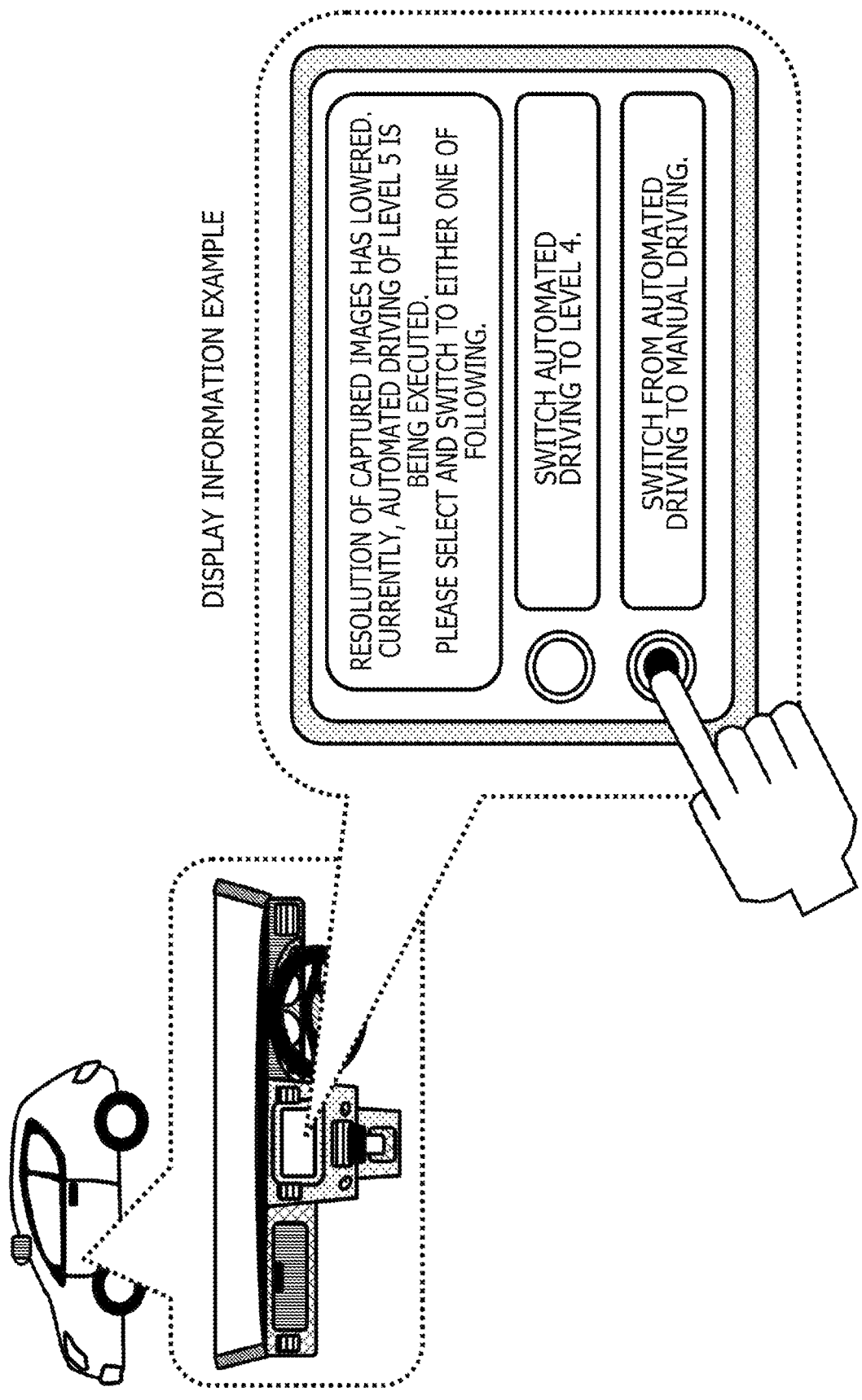
FIG. 15 is a figure for explaining an example of display data output by the information processing apparatus according to the present disclosure.

If the user wants to switch from automated driving to manual driving, she/he selects the bottom choice, Switch from automated driving to manual driving as depicted in FIG. 15, for example.

In such a manner, the user can input selection information regarding either choice of the two choices displayed on the display section.

Note that the display data examples depicted in FIG. 14 and FIG. 15 are examples of display data in a case where automated driving of the moving apparatus (example: vehicle) 10 is currently being executed.

Different data is displayed in a case where not automated driving but manual driving of the moving apparatus (example: vehicle) 10 is currently being executed.

Figure 16:
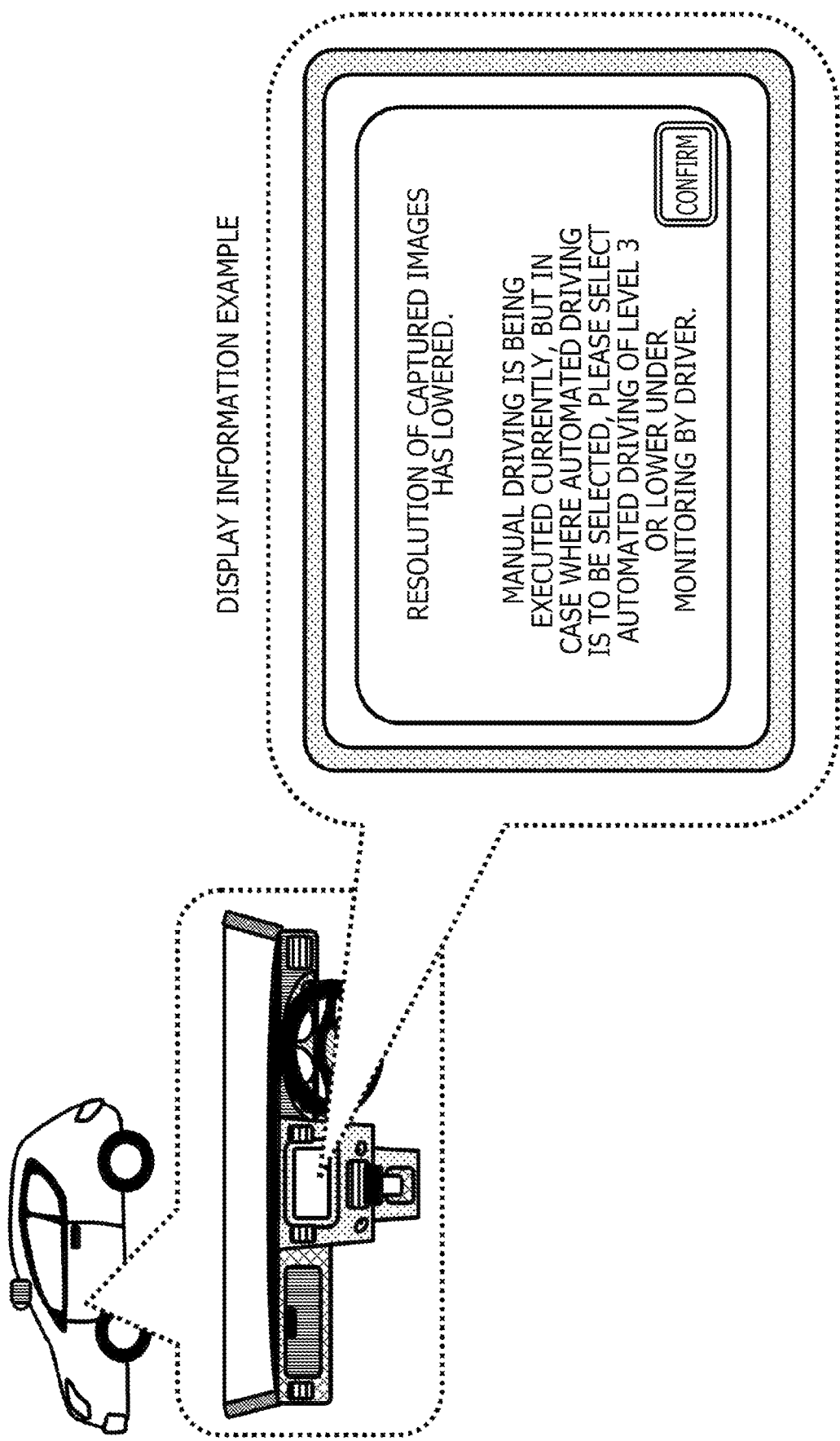
FIG. 16 is a figure for explaining an example of display data output by the information processing apparatus according to the present disclosure.

FIG. 16 depicts an example of display data in a case where not automated driving but manual driving of the moving apparatus (example: vehicle) 10 is currently being executed.

The display information example depicted in FIG. 16 is an example in which the following message is displayed.

"Resolution of captured images has lowered. Manual driving is being executed currently, but there is possibility that abnormality has occurred to automated driving control system. In case where automated driving is to be selected, automated driving of Level 3 or lower under monitoring by driver is recommended."

By looking at the message displayed on the display section, it becomes possible for the driver, who is a user, to recognize that there is a possibility that the resolution of images captured with the camera has lowered, and to stop transition to automated driving or to select automated driving at a low level and cope with the situation by paying close attention during the automated driving, for example.

<4. Configuration Examples of Moving Apparatus and Information Processing Apparatus According to Present Disclosure>

Next, configuration examples of the moving apparatus and the information processing apparatus according to the present disclosure are explained.

Figure 17:
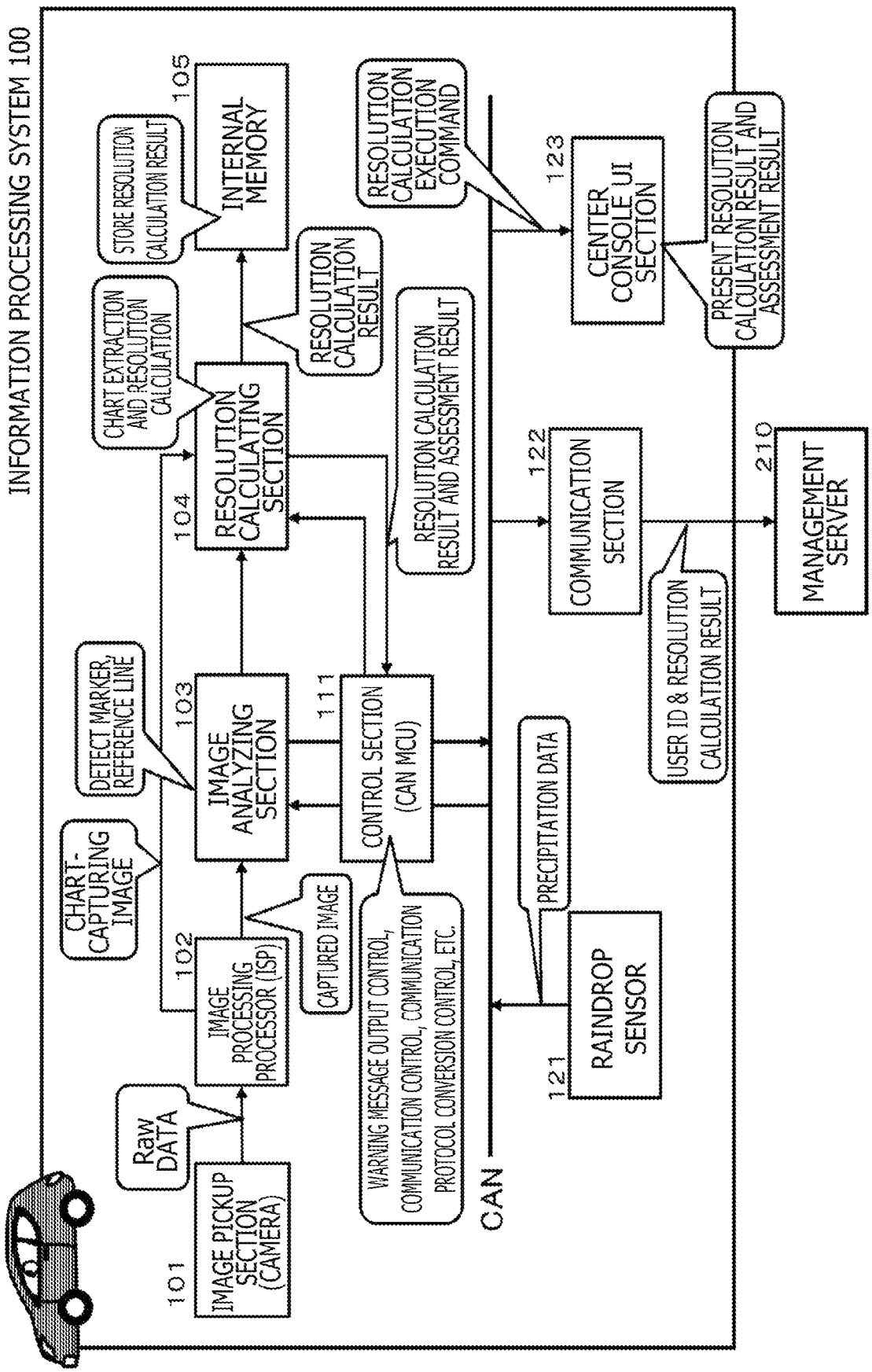
FIG. 17 is a figure for explaining a configuration example of the information processing apparatus according to the present disclosure.

FIG. 17 is a block diagram for explaining a configuration example of an information processing system 100 mounted on the moving apparatus (example: vehicle) 10 according to the present disclosure.

As depicted in FIG. 17, the information processing system 100 has an image pickup section (camera) 101, an image processing processor (ISP) 102, an image analyzing section 103, a resolution calculating section 104, an internal memory 105, and a control section (CAN MCU: automotive network microcontroller unit) 111, and further has, as automotive network (CAN) connection constituent elements, a raindrop sensor 121, a communication section 122, and a center console UI section 123. Each of the image pickup section (camera) 101, the image processing processor (ISP) 102, the image analyzing section 103, the resolution calculating section 104, the internal memory 105, and the control section (CAN MCU: automotive network microcontroller unit) 111, and further, the raindrop sensor 121, the communication section 122, and the center console UI section 123 as automotive network (CAN) connection constituent elements may be configured as one apparatus. In addition, any combination of the image pickup section (camera) 101, the image processing processor (ISP) 102, the image analyzing section 103, the resolution calculating section 104, the internal memory 105, and the control section (CAN MCU: automotive network microcontroller unit) 111, and further, the raindrop sensor 121, the communication section 122, and the center console UI section 123 as automotive network (CAN) connection constituent elements may be provided as an apparatus.

In addition, the image processing processor (ISP) 102, the image analyzing section 103, the resolution calculating section 104, the internal memory 105, and the control section (CAN MCU: automotive network microcontroller unit) 111 may be configured as one apparatus or the image pickup section (camera) 101, the image processing processor (ISP) 102, the image analyzing section 103, the resolution calculating section 104, and the internal memory 105 may be configured as one apparatus. The image analyzing section 103, the resolution calculating section 104, and the internal memory 105 may be configured as one apparatus.

For example, the image pickup section (camera) 101 corresponds to the camera 10 attached to the moving apparatus (example: vehicle) 10 depicted in FIG. 1 and FIG. 3.

The image pickup section (camera) 101 is a camera that captures images of the space in front of the moving apparatus (example: vehicle) 10.

The camera 101 constantly captures images of the space in the front direction of the moving apparatus (example: vehicle) 10 while the moving apparatus (example: vehicle) 10 is running.

RAW images which are image-capturing data obtained by the image pickup section (camera) 101 are input to the image processing processor (ISP) 102.

The image processing processor (ISP) 102 receives input of the RAW images which are image-capturing data obtained by the image pickup section (camera) 101, and executes typical camera signal processing for image generation such as white balance or gamma correction to generate captured image data. The captured image data is input to the image analyzing section and the resolution calculating section 104 on the downstream side.

Note that an image input to the resolution calculating section 104 is an image for resolution analysis. That is, the image is a chart-capturing image that is explained with reference to FIG. 3 and the like earlier and is captured with the image pickup section (camera) 101 at a timing of detection of the reference line 22.

Note that whereas FIG. 17 depicts a configuration in which the chart-capturing image is directly input from the image processing processor (ISP) 102 to the resolution calculating section 104, this depicts the data flow in a simplified manner. In reality, the chart-capturing image captured with the image pickup section (camera) 101 at the timing of detection of the reference line 22 is temporarily stored in the internal memory 105. Thereafter, the resolution calculating section 104 performs resolution analysis by using the image stored in the internal memory 105.

The image analyzing section 103 receives input of the captured image data obtained by the image pickup section (camera) 101 from the image processing processor (ISP) 102, and performs detection of the marker and the reference line in captured images.

As explained with reference to FIG. 3 earlier, the marker and the reference line are identification marks recorded on a road for specifying a timing to capture an image for resolution analysis.

The marker is a mark representing that the reference line is recorded in front of it.

An image of the chart is captured at a timing of detection of the reference line in front of the marker, and the resolution analysis process is performed by treating this captured image frame as an image frame for resolution analysis.

Performing such a process makes it possible to perform resolution analysis of images captured with the camera that uses the captured images of the chart captured from positions at a constant distance.

For example, the image analyzing section 103 outputs image-capturing time information concerning the image frame for resolution analysis to the resolution calculating section 104.

In reference to the image-capturing time information concerning the image frame for resolution analysis input from the image analyzing section 103, the resolution calculating section 104 acquires an image captured at a time matching the input image-capturing time information from captured images stored in an internal memory 195, and performs resolution analysis by using the acquired image.

Note that images included in sequentially captured images (video data) captured with the image pickup section (camera) 101 and generated at the image processing processor (ISP) 102 are recorded in the internal memory 105 along with image-capturing time information of each image.

The resolution calculating section 104 acquires, from the internal memory 105, an image captured at a time matching the time of capture of the image frame for resolution analysis input from the image analyzing section 103, and performs resolution analysis by using the acquired image.

The acquired image is a captured image of the chart 23 explained with reference to FIG. 3, and is an image capturing the chart 23 from a position at the distance of L (=L1+L2) depicted in FIG. 3.

As explained with reference to FIG. 3 earlier, the distance between the reference line 22 and the chart is L1, and the distance between the reference line 22 and the image pickup section (camera) 101 (=the camera 10 in FIG. 3) is L2. These L1 and L2 are both fixed values, and the distance L from the image pickup section (camera) 101 (=the camera 10 in FIG. 3) to the chart 23 is $$L=L1+L2$$

and is a fixed distance.

Accordingly, performing resolution analysis by selecting image frames of the chart 23 captured at timings of detection of the reference line 22 and treating the selected image frames as image frames for resolution analysis make it possible to perform a highly precise resolution calculation based on captured images of the chart 23 captured from positions at the constant distance (L=L1+L2).

Note that whereas the chart 23 can be of any of various types as explained with reference to FIG. 6 earlier, no matter which type is used, images of the edges of chart-capturing images differ depending on camera resolutions as explained with reference to FIGS. 7A, 7B, and 7C earlier. That is, an image of the edge of an image captured with a camera having a lowered resolution is blurred.

The resolution calculating section 104 takes out the image for resolution analysis capturing the chart 23 from the internal memory 105, analyzes the luminance distribution or the like of the edge of a chart image included in the captured image, for example, and analyzes the resolution of the camera 101.

Note that any of various existing algorithms can be applied as the resolution analysis algorithm.

An example of the resolution analysis algorithm is the process explained with reference to the flowcharts in FIG. 10 and FIG. 11 earlier, for example, and is a process in which a modulation transfer function (MTF), which is an index value of the contrast of a chart image, is calculated, and the resolution of the image pickup section (camera) 101 is calculated in reference to the calculated modulation transfer function (MTF).

As depicted in FIG. 17, the information processing system 100 has the control section (CAN MCU: automotive network microcontroller unit) 111, and further includes the raindrop sensor 121, the communication section 122, and the center console UI section 123 as automotive network (CAN) connection constituent elements.

The control section (CAN MCU) 111 executes communication data protocol conversion between the image analyzing section 103 or the resolution calculating section 104 and the automotive network (CAN).

Moreover, the control section (CAN MCU) 111 assesses whether or not, for example, the camera resolution calculated by the resolution calculating section 104 is equal to or lower than the prespecified standard value (threshold value), and, in a case where the camera resolution is equal to or lower than the prespecified threshold value, executes a process of outputting a warning or the like.

The warning is output to the center console UI section 123 configured as an automotive network (CAN) connection constituent element.

For example, in a case where the camera resolution is equal to or lower than the prespecified threshold value, a warning to give notice that the reliability of automated driving processing functionalities to perform automated driving or supported driving of the moving apparatus has lowered or a warning to prompt lowering of the level of automated driving being executed for the moving apparatus is output.

In addition, the control section (CAN MCU) 111 performs level control of automated driving in a case where the camera resolution is equal to or lower than the prespecified threshold value. Alternatively, a command may be output to a driving control section outside the information processing system 100 to cause the driving control section to execute automated driving level control. For example, the control section (CAN MCU) 111 executes or causes the driving control section to execute control to lower the level of automated driving of the moving apparatus or to switch to manual driving.

For example, as explained with reference to FIG. 15 earlier, control to lower the level of automated driving of the moving apparatus or to switch to manual driving is executed according to user input via an input section (a touch display-type UI).

The raindrop sensor 121 configured as an automotive network (CAN) connection constituent element is a sensor attached to the roof of the moving apparatus (example: vehicle), for example, and detects the state of rainfall.

Detected information from the raindrop sensor 121, that is, information as to whether or not it is raining, is reported to the image analyzing section 103 or the resolution calculating section 104 via the control section (CAN MCU) 111.

As explained with reference to the flowcharts depicted in FIG. 10 and FIG. 11 earlier, since the sight is bad and the resolution analysis process based on chart-capturing images cannot be executed highly precisely in a case where it is raining, the resolution analysis is stopped.

In addition, the resolution information calculated at the resolution calculating section 104 is transmitted to a management server 210 via the communication section 122 configured as an automotive network (CAN) connection constituent element via the control section (CAN MCU: automotive network microcontroller unit) 111.

Note that, when the resolution information is transmitted to the external management server 210, an identifier (ID) of the moving apparatus (example: vehicle) 10 or the information processing apparatus, and furthermore a timing at which the resolution is calculated (date/time) are also transmitted along with the resolution.

The management server 210 receives the value of the resolution from each vehicle, generates resolution history data of each moving apparatus, and records the resolution history data in a database in the server.

By referring to the history data, the management server 210 analyzes a lowering tendency of the resolution of images captured with the camera attached to each moving apparatus, and, for example, in a case where the resolution has lowered to a tolerance level required for automated driving, performs a process of transmitting a warning to the moving apparatus, for example.

In addition, the warning information based on the resolution information calculated at the resolution calculating section 104 is output to the center console UI section 123 configured as an automotive network (CAN) connection constituent element via the control section (CAN MCU: automotive network microcontroller unit) 111.

This is the warning information output process explained with reference to FIG. 8, FIG. 9, and FIG. 12 to FIG. 16 earlier, for example.

Note that whereas, in one possible manner of configuration, the control section (CAN MCU) 111 of the information processing system 100 depicted in FIG. 17 itself performs control of the automated driving level as mentioned before, the control section (CAN MCU) 111 outputs a control command for automated driving control or supported driving to the driving control section outside the information processing system 100 by communicating with the driving control section via the CAN in one possible manner of configuration.

For example, when the resolution information generated by the information processing system 100 is output to the driving control section, the driving control section executes control to set the automated driving level or switch to manual driving.

In addition, the driving control section may be configured inside the information processing system 100 as a constituent element separate from the control section (CAN MCU) 111.

<5. Information Processing System Configuration Example Having Server That Collects and Analyzes Resolution Analysis Results from Each Moving Apparatus>

Next, an information processing system configuration example having a server that collects and analyzes resolution analysis results from each moving apparatus is explained.

For example, when multiple moving apparatuses (example: vehicles) on which an automotive camera provided by a certain automotive camera manufacturer is mounted perform the processes mentioned above, that is, capture images of charts on roads, and perform the resolution analysis based on the captured images, this leads to acquisition of many resolution analysis results corresponding to the one certain automotive camera.

Such data is data useful for analyzing the performance, weaknesses, and further, aging and the like of the automotive camera, for example.

Figure 18:
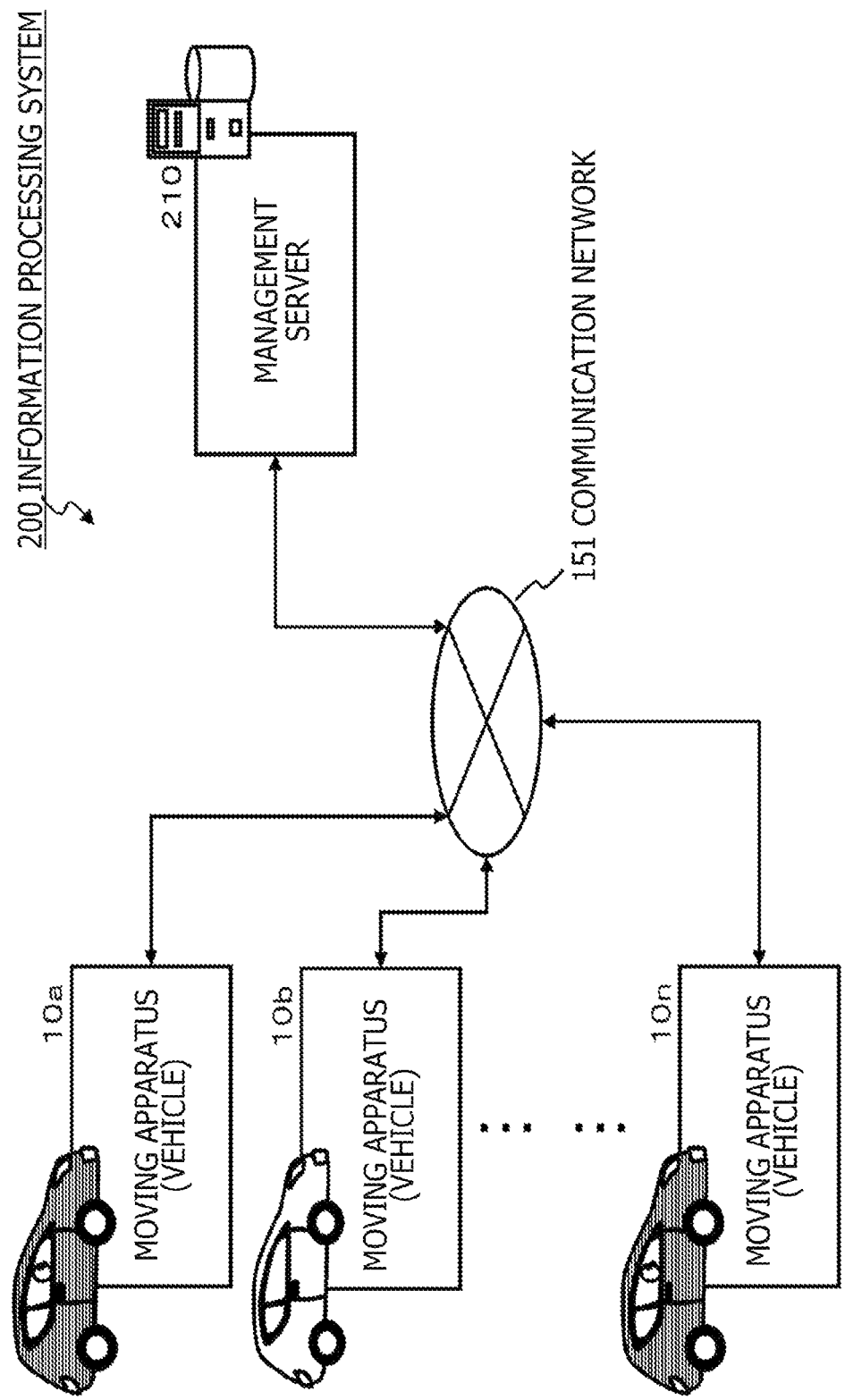
FIG. 18 is a figure for explaining a configuration example of the information processing system according to the present disclosure.

For example, an information processing system 200 in which many moving apparatuses 10a to 10n and the management server 210 of the automotive camera manufacturer are linked by a communication network 151 is constructed as depicted in FIG. 18.

Each of the moving apparatuses (example: vehicles) 10a to 10n sequentially transmits, to the management server 210, results of the resolution analysis executed in the moving apparatus (example: vehicle).

The management server 210 examines the resolution analysis results received from the respective moving apparatuses (example: vehicles) 10a to 10n. The examination process of the resolution analysis results, for example, makes it possible to highly precisely analyze the aging, weaknesses, and the like of the automotive camera, and can further be used for development of new products.

<6. Hardware Configuration Example of Information Processing Apparatus According to Present Disclosure>

Next, a specific hardware configuration example of the information processing apparatus according to the present disclosure is explained with reference to FIG. 19.

Figure 19:
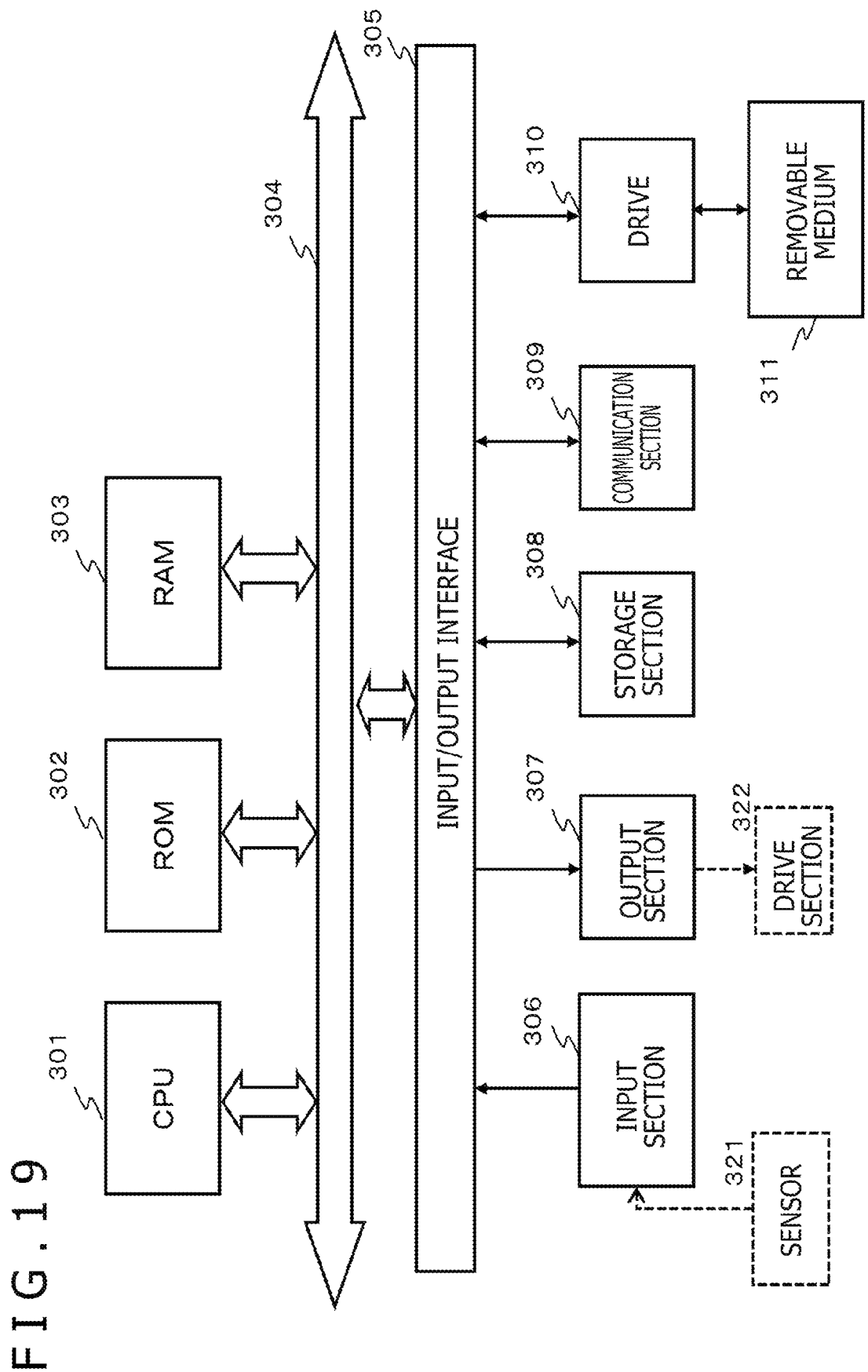
FIG. 19 is a figure for explaining a hardware configuration example of the information processing apparatus according to the present disclosure.

FIG. 19 is a figure depicting an example of the hardware configuration of the information processing system 100 according to the present disclosure explained with reference to FIG. 17 earlier.

Hereinbelow, each constituent element of the hardware configuration depicted in FIG. 19 is explained.

A CPU (Central Processing Unit) 301 functions as a data processing section that executes various types of processes in accordance with a program stored in a ROM (Read Only Memory) 302 or a storage section 308. For example, the CPU 301 executes processes according to the sequence explained in the embodiment mentioned above. A RAM (Random Access Memory) 303 has stored therein a program executed by the CPU 301, data, and the like. The CPU 301, the ROM 302, and the RAM 303 are interconnected by a bus 304.

The CPU 301 is connected to an input/output interface 305 via the bus 304, and the input/output interface 305 is connected with an input section 306 including various types of switches, a keyboard, a touch panel, a mouse, and a microphone, and further, sensors such as cameras, a situation data acquiring section such as a GPS and the like, and an output section 307 including a display, a speaker, and the like.

Note that the input section 306 receives input of input information from sensors 321 such as cameras.

In addition, the output section 307 also outputs drive information for a drive section 322 of the moving apparatus.

The CPU 301 receives input of commands, situation data, and the like input from the input section 306, executes various types of processes, and outputs processing results to the output section 307, for example.

The storage section 308 connected to the input/output interface 305 includes a hard disk and the like, for example, and stores a program executed by the CPU 301 and various types of data. A communication section 309 functions as a transmitting/receiving section for data communication via a network such as the Internet or a local area network, and communicates with external apparatuses.

A drive 310 connected to the input/output interface 305 drives a removable medium 311 such as a magnetic disc, an optical disc, a magneto-optical disc, or a semiconductor memory such as a memory card, and executes recording or reading of data.

<7. Summary of Configuration According to Present Disclosure>

Thus far, an embodiment according to the present disclosure has been explained in detail with reference to a specific embodiment. However, it is obvious that those skilled in the art can conceive of modifications or substitutions of embodiments within the scope not departing from the gist of the present disclosure. That is, the present invention has been disclosed in exemplary forms, and should not be interpreted in a limited manner. To determine the gist of the present disclosure, the section of claims should be taken into consideration.

It should be noted that the technology disclosed in the specification can take the following configuration.

(1)
An information processing apparatus including:
an image analyzing section that receives input of an image captured with a camera and performs analysis of the input image; and
a resolution calculating section that calculates a resolution of the captured image, in which
the image analyzing section selects, from images captured with the camera and as an image for resolution analysis, an image captured at a timing of detection of a reference line at a predetermined position, and
the resolution calculating section uses a chart image for resolution analysis included in the image for resolution analysis selected by the image analyzing section, to calculate the resolution of the captured image.

(2)
The information processing apparatus according to (1), in which
the reference line includes a reference line recorded on a road where the moving apparatus is running, at a position at a constant distance from a chart for resolution analysis installed on the road, and
the image analyzing section selects, as an image for resolution analysis, an image captured at a position where the reference line is captured with a camera attached to the moving apparatus.

(3)
The information processing apparatus according to (1) or (2), in which
the image analyzing section selects, from images captured with the camera and as an image for resolution analysis, an image captured at a timing of detection of a reference line, and stores the image for resolution analysis in a storage section, and
the resolution calculating section acquires the image for resolution analysis stored in the storage section, and uses a chart image for resolution analysis included in the acquired image for resolution analysis, to calculate the resolution of the captured image.

(4)
The information processing apparatus according to any one of (1) through (3), further including:
a control section that receives input of the resolution of the captured image calculated by the resolution calculating section, in which
the control section
assesses whether or not the resolution of the captured image calculated by the resolution calculating section is equal to or lower than a prespecified threshold value, and
outputs a warning in a case where the resolution of the captured image is equal to or lower than the prespecified threshold value.

(5)
The information processing apparatus according to (4), in which the control section outputs a warning to give notice that reliability of an automated driving processing functionality to perform automated driving or supported driving of the moving apparatus has lowered, in a case where the resolution of the captured image is equal to or lower than the prespecified threshold value.

(6)
The information processing apparatus according to (4) or (5), in which the control section outputs a warning to prompt lowering of a level of automated driving being executed for the moving apparatus, in a case where the resolution of the captured image is equal to or lower than the prespecified threshold value.

(7)
The information processing apparatus according to any one of (1) through (6), further including:
a control section that receives input of the resolution of the captured image calculated by the resolution calculating section, in which
the control section
assesses whether or not the resolution of the captured image calculated by the resolution calculating section is equal to or lower than a prespecified threshold value, and
executes level control of automated driving of the moving apparatus in a case where the resolution of the captured image is equal to or lower than the prespecified threshold value.

(8)
The information processing apparatus according to (7), in which the control section executes control to lower a level of the automated driving of the moving apparatus or to switch to manual driving, in a case where the resolution of the captured image is equal to or lower than the prespecified threshold value.

(9)
The information processing apparatus according to (8), in which the control section executes control to lower the level of the automated driving of the moving apparatus or to switch to the manual driving, according to user input via an input section.

(10)
An information processing system including:
a moving apparatus; and
a management server, in which
the moving apparatus has
an image analyzing section that receives input of an image captured with a camera attached to the moving apparatus and performs analysis of the input image, a resolution calculating section that calculates a resolution of the camera, and a communication section, the image analyzing section selects, from images captured with the camera and as an image for resolution analysis, an image captured at a timing of detection of a reference line, the resolution calculating section uses a chart image for resolution analysis included in the image for resolution analysis selected by the image analyzing section, to calculate a resolution of the captured image, and transmits the calculated resolution to the management server via the communication section, and the management server executes analysis of multiple pieces of resolution data received from multiple moving apparatuses.

(11)

An information processing method executed in an information processing apparatus mounted on a moving apparatus, the information processing method including:

an image analysis step, executed by an image analyzing section, of selecting, from images captured with a camera attached to the moving apparatus and as an image for resolution analysis, an image captured at a timing of detection of a reference line; and a captured-image resolution calculation step, executed by a resolution calculating section, of using a chart image for resolution analysis included in the image for resolution analysis selected in the image analysis step, to calculate a resolution of the captured image.

(12)

An information processing method executed in an information processing system having a moving apparatus and a management server, the information processing method including:

an image analysis step, executed by an image analyzing section of the moving apparatus, of selecting, from images captured with a camera attached to the moving apparatus and as an image for resolution analysis, an image captured at a timing of detection of a reference line; and a resolution calculation/transmission step, executed by a resolution calculating section of the moving apparatus, of using a chart image for resolution analysis included in the image for resolution analysis selected in the image analysis step, to calculate a resolution of the captured image, and transmitting the calculated resolution to the management server, in which the management server executes analysis of multiple pieces of resolution data received from multiple moving apparatuses.

(13)

A program that causes an information processing apparatus mounted on a moving apparatus to execute information processing, the program causing:

an image analyzing section to execute an image analysis step of selecting, from images captured with a camera attached to the moving apparatus and as an image for resolution analysis, an image captured at a timing of detection of a reference line; and a resolution calculating section to execute a captured-image resolution calculation step of using a chart image for resolution analysis included in the image for resolution analysis selected in the image analysis step, to calculate a resolution of the captured image.

In addition, the series of processes explained in the specification can be executed by hardware, software, or combined configuration of hardware and software. In a case where the processes are executed by software, a program in which the process sequence is recorded can be installed into a memory in a computer incorporated into dedicated hardware, and can be executed therein, or the program can be installed on a general-purpose computer that can execute various types of processes, and can be executed thereon. For example, the program can be recorded in advance in a recording medium. Other than being installed in a computer from the recording medium, the program can be received via a network as exemplified by a LAN (Local Area Network) or the Internet, and installed in a built-in recording medium such as a hard disk.

Note that various types of processes described in the specification may not only be executed in a temporal sequence according to the descriptions, but also be executed in parallel or separately as necessary or according to the processing capability of an apparatus to execute the processes. In addition, a system in the present specification means logical collective configuration of multiple apparatuses, and is not limited to one that includes apparatuses of respective types of configuration that are housed within a single housing.

INDUSTRIAL APPLICABILITY

As explained above, according to the configuration of an embodiment of the present disclosure, it is possible to realize configuration in which images of a chart installed on a road are captured from positions at a constant distance, the captured images are analyzed to calculate the resolution of the images captured with the camera, and a warning output/automated-driving-level lowering process is executed depending on a result of the calculation.

Specifically, for example, the image analyzing section selects, from camera-captured images and as an image for resolution analysis, an image captured at a timing of detection of a reference line. The resolution calculating section calculates the resolution of an image captured with the camera, by using a chart image for resolution analysis included in the image for resolution analysis selected by the image analyzing section. The reference line is recorded on the road where the moving apparatus is running, at positions at the constant distance from the chart for resolution analysis installed on the road, and a highly precise resolution of the camera based on images of the chart captured from the positions at the constant distance can be calculated.

This configuration makes it possible to realize a configuration in which images of a chart installed on a road are captured from positions at a constant distance, the captured images are analyzed to calculate the camera resolution, and a warning output/automated-driving-level lowering process is executed depending on a result of the calculation.

REFERENCE SIGNS LIST

10: Moving apparatus (example: vehicle)
11: Camera
21: Marker
22: Reference line
23: Chart
100: Information processing system
101: Image pickup section (camera)
102: Image processing processor (ISP)
103: Image analyzing section
104: Resolution calculating section
105: Internal memory 111: Control section (CAN MCU)
121: Raindrop sensor section
122: Communication section
123: Center console UI section
200: Information processing system
210: Management server
301: CPU
302: ROM
303: RAM
304: Bus
305: Input/output interface
306: Input section
307: Output section
308: Storage section
309: Communication section
310: Drive
311: Removable medium
321: Sensor
322: Drive section

The invention claimed is:

1. An information processing apparatus, comprising:
a central processing unit (CPU) configured to:
  receive an input of a plurality of images captured with a camera, wherein
    the camera is attached to a moving apparatus that is in movement on a road,
    the road includes a plurality of reference lines and a plurality of charts,
    each of the plurality of reference lines is associated with a corresponding chart of the plurality of charts, and
    each of the plurality of reference lines is at a specific distance from the corresponding chart;
  detect a first reference line of the plurality of the reference lines on the road;
  select, from the plurality of images, a first image captured at a time of the detection of the first reference line;
  determine a first chart image in the first image, wherein the first chart image is associated with a first chart of the plurality of charts;
  determine a resolution of the first image based on the first chart image; and
  control the movement of the moving apparatus based on the determined resolution of the first image.

2. The information processing apparatus according to claim 1, wherein the CPU is further configured to:
  detect the first reference line at a first position of the moving apparatus; and
  select, the first image at the first position of the moving apparatus.

3. The information processing apparatus according to claim 1, further comprises a memory, wherein the CPU is further configured to:
  detect a second reference line of the plurality of the reference lines on the road;
  select, from the plurality of images, a second image captured at a time of the detection of the second reference line, wherein the memory is configured to store the second image;
  acquire the second image from the memory;
  determine a second chart image, wherein the second chart image is included in the acquired second image; and
  determine a resolution of the second image based on the second chart image.

4. The information processing apparatus according to claim 1, wherein the CPU is further configured to:
  receive an input of the resolution of the first image;
  determine that the resolution of the first image is equal to or less than a specific threshold value; and
  output a first warning message based on the determination that the resolution of the first image is equal to or less than the specific threshold value.

5. The information processing apparatus according to claim 4, wherein
  the first warning message is associated with a reliability of an automated driving processing functionality,
  the reliability of the automated driving processing functionality is lower than a specific value, and
  the automated driving processing functionality is associated with at least one of automated driving of the moving apparatus or supported driving of the moving apparatus.

6. The information processing apparatus according to claim 4, wherein the CPU is further configured to output, based on the determination that the resolution of the first image is equal to or less than the specific threshold value, a second warning message to lower a level of automated driving of the moving apparatus.

7. The information processing apparatus according to claim 1, wherein the CPU is further configured to:
  receive an input of the resolution of the first image;
  determine that the resolution of the first image is equal to or less than a specific threshold value; and
  execute level control of automated driving of the moving apparatus based on the determination that the resolution of the first image is equal to or less than the specific threshold value.

8. The information processing apparatus according to claim 7, wherein based on the determination that the resolution of the first image is equal to or less than the specific threshold value, the CPU is further configured to one of
  lower a level of the automated driving of the moving apparatus, or
  switch to manual driving of the moving apparatus.

9. The information processing apparatus according to claim 8, wherein based on a user input, the CPU is further configured to one of
  lower the level of the automated driving of the moving apparatus, or
  switch to the manual driving of the moving apparatus.

10. An information processing system, comprising:
a plurality of moving apparatuses; and
a management server associated with each of the plurality of moving apparatuses, wherein each of plurality of the moving apparatuses includes a central processing unit (CPU), wherein the CPU is configured to:
  an input of a plurality of images captured with a plurality of cameras, wherein
    each of the plurality of cameras is in a corresponding moving apparatus of the plurality of moving apparatuses that are in movement on a road,
    the road includes a plurality of reference lines and a plurality of charts,
    each of the plurality of reference lines is associated with a corresponding chart of the plurality of charts, and
    each of the plurality of reference lines is at a specific distance from the corresponding chart;
  determine a resolution of each of the plurality of cameras;
  detect a reference line of the plurality of the reference lines on the road;

select, from the plurality of images, a specific image captured at a time of the detection of the reference line;
determine a chart image in the specific image, wherein the chart image is associated with a specific chart of the plurality of charts;
determine a resolution of the specific image based on the chart image; and
transmit the determined resolution of the specific image to the management server, wherein the management server is configured to:
receive the determined resolution of the specific image; and
determine, based on the received resolution of the specific image, a tendency of a resolution of the plurality of images, wherein the tendency of the resolution of the plurality of images is lower than a specific value.

11. An information processing method, comprising:
in an information processing apparatus:
receiving an input of a plurality of images captured with a camera, wherein
the camera is attached to a moving apparatus that is in movement on a road,
the road includes a plurality of reference lines and a plurality of charts,
each of the plurality of reference lines is associated with a corresponding chart of the plurality of charts, and
each of the plurality of reference lines is at a specific distance from the corresponding chart;
detecting a reference line of the plurality of the reference lines on the road;
selecting, from the plurality of images, a specific image captured at a time of the detection of the reference line;
determining a chart image in the specific image, wherein the chart image is associated with a specific chart of the plurality of charts;
determining a resolution of the specific image based on the chart image; and
controlling the movement of the moving apparatus based on the determined resolution of the specific image.

12. An information processing method, comprising:
in an information processing system:
receiving an input of a plurality of images captured with a plurality of cameras, wherein
each of the plurality of cameras is in a corresponding moving apparatus of a plurality of moving apparatuses that are in movement on a road,
the road includes a plurality of reference lines and a plurality of charts,
each of the plurality of reference lines is associated with a corresponding chart of the plurality of charts, and
each of the plurality of reference lines is at a specific distance from the corresponding chart;
detecting a reference line of the plurality of the reference lines on the road;
selecting, from the plurality of images, a specific image captured at a time of the detection of the reference line;
determining a chart image in the specific image, wherein the chart image is associated with a specific chart of the plurality of charts;
determining a resolution of the specific image based on the chart image;
transmitting the determined resolution of the specific image to a management server; and
determining, based on the resolution of the specific image, a tendency of a resolution of the plurality of images, wherein the tendency of the resolution of the plurality of images is lower than a specific value.

13. A non-transitory computer-readable medium having stored thereon, computer-executable instructions which, when executed by a computer, cause the computer to execute operations, the operations comprising:
receiving an input of a plurality of images captured with a camera, wherein
the camera is attached to a moving apparatus that is in movement on a road,
the road includes a plurality of reference lines and a plurality of charts,
each of the plurality of reference lines is associated with a corresponding chart of the plurality of charts, and
each of the plurality of reference line is at a specific distance from the corresponding chart;
detecting a reference line of the plurality of the reference lines on the road;
selecting, from the plurality of images, a specific image captured at a time of the detection of the reference line;
determining a chart image in the specific image, wherein the chart image is associated with a specific chart of the plurality of charts;
determining a resolution of the specific image based on the chart image; and
controlling the movement of the moving apparatus based on the determined resolution of the specific image.

* * * * *